United States Patent
El-Ferik et al.

(10) Patent No.: US 11,809,166 B2
(45) Date of Patent: Nov. 7, 2023

(54) CONTROL LOOP PERFORMANCE ADVISORY TOOL

(71) Applicant: KING FAHD UNIVERSITY OF PETROLEUM AND MINERALS, Dhahran (SA)

(72) Inventors: Sami El-Ferik, Dhahran (SA); Mustafa Alnaser, Al-Khobar (SA)

(73) Assignees: KING FAHD UNIVERSITY OF PETROLEUM AND MINERALS, Dhahran (SA); Yokogawa Saudi Arabia Company, Al-Khobar (SA)

( * ) Notice: Subject to any disclaimer, the term of this patent is extended or adjusted under 35 U.S.C. 154(b) by 100 days.

(21) Appl. No.: 17/353,080

(22) Filed: Jun. 21, 2021

(65) Prior Publication Data

US 2022/0404797 A1 Dec. 22, 2022

(51) Int. Cl.
 *G05B 19/416* (2006.01)

(52) U.S. Cl.
 CPC .. *G05B 19/416* (2013.01); *G05B 2219/37371* (2013.01)

(58) Field of Classification Search
 CPC ............... G05B 19/416; G05B 2219/37371
 USPC ..................... 700/282, 32, 54, 71
 See application file for complete search history.

(56) References Cited

U.S. PATENT DOCUMENTS

| 8,145,328 B2 * | 3/2012 | Choudhury ........ G05B 23/0229 700/35 |
| 10,626,749 B2 | 4/2020 | Reigl |
| 2007/0088446 A1 * | 4/2007 | Srinivasan ............ G05D 7/005 700/32 |
| 2017/0175920 A1 * | 6/2017 | El Ferik ............... G05B 13/041 |

(Continued)

FOREIGN PATENT DOCUMENTS

| CN | 102542865 B | * | 5/2014 |
| CN | 109389896 A | * | 2/2019 |

OTHER PUBLICATIONS

El ferik et al., "Control valve stiction compensation by dynamic inversion: a comparative study", Journal of Quality in Maintenance Engineering, vol. 24 No. 3, pp. 400-419 (Year: 2017).*

(Continued)

*Primary Examiner* — Thomas C Lee
*Assistant Examiner* — Michael Tang
(74) *Attorney, Agent, or Firm* — Oblon, McClelland, Maier & Neustadt, L.L.P.

(57) ABSTRACT

A method and system for compensating for stiction of a control valve in a pneumatically controlled valve system. A digital twin model of the pneumatically controlled valve system is generated. A current segment of data signals is received from a process measurement device connected to the pneumatically controlled valve system. Operation of the pneumatically controlled valve system is monitored by comparing the current segment to the digital twin model. Stiction is detected when the digital twin model directly (Continued)

detects stiction or when the nonlinearity and Gaussian index are above a certain threshold. A severity of the stiction is determined. Instructions for a stiction control device are used to generate control signals to be applied to the actuator to compensate for the severity of the stiction. Further, the digital twin model is displayed with a representation of the severity of the stiction.

13 Claims, 15 Drawing Sheets

(56) References Cited

U.S. PATENT DOCUMENTS

2018/0058250 A1\* 3/2018 Reigl .................. G05D 7/0635
2018/0247202 A1 8/2018 El Ferik et al.

OTHER PUBLICATIONS

Mishra et al., "An online tuned novel nonlinear PI controller for stiction compensation in pneumatic control valves", ISA Transactions 58 (2015) 434-445 (Year: 2015).\*

Di Capaci et al., "Review and comparison of techniques of analysis of valve stiction—From modeling to smart diagnosis", Chemical Engineering Research and Design 130 (2018) 230-265 (Year: 2018).\*

Daneshwar et al. "Identification of a process with control valve stiction using a fuzzy system—a data-driven approach", Journal of Process Control 24 (2014) 249-260 (Year: 2014).\*

Elferik, et al. ; Control valve stiction compensation by dynamic inversion: a comparative study. ; Journal of Quality in Maintenance Engineering ; Jul. 7, 2018 ; 17 Pages.

\* cited by examiner

CONTROL LOOP PERFORMANCE ADVISORY TOOL

BACKGROUND

Technical Field

The present disclosure is directed to a pneumatically controlled valve system and an advisory tool for stiction diagnosis of control valves in the pneumatically controlled valve system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A process or a production plant may have a plethora of control loops which interact with one another. Any fault or failure in a given control loop may negatively affect downstream or upstream loops, and thus propagate through the interacting control loops to create a plant-wide disturbance. These control loops suffer from oscillations, poor disturbance rejection, poor set-point tracking, and poor controller tuning. Stiction (static friction nonlinearity) is a root cause of periodic oscillations or cycling in control loops. Taking into account non-linear dynamics due to stiction in the control strategy may enhance the control loop performance, which in turn will improve the product quality, plant economy, and safety.

The Instrument Society of America (ISA) defines stiction as: "the resistance to the start of the motion, usually measured as the difference between the driving values required to overcome static friction upscale and downscale" (ISA Subcommittee SP75.05, 1979). Valve stiction is inherently a physical problem, and the way to resolve it has been through periodical valve maintenance, which is typically between 6 months to 3 years, or when the level of stiction is above a given threshold that varies from plant to plant and typically is within 3% to 10% of the input signal. Shutting down the process to perform the maintenance causes the production line to be shut down, especially when there is no bypass line. The loss of energy and product quality due to cycling induced by the stiction and income loss due to production shutdown to perform maintenance can be quite high. For these reasons, identification, quantification, and compensation for stiction are needed to ensure improved asset management, high-quality product, better energy management, cost reduction and higher savings.

Various solutions have been developed in recent years to take into account for non-linear dynamics (for example, stiction) in a process control strategy to improve control loop performance. A system for monitoring steam turbine valve spindle vibration by a data acquisition system was described in U.S. Pat. No. 10,626,749B2, "Spindle vibration evaluation module for a valve and actuator monitoring system", incorporated herein by reference in its entirety. Stiction compensation in a process control system in which valve stiction is determined and a control signal to compensate for the stiction was described in US20070088446A1, "Apparatus and method for stiction compensation in a process control system", incorporated herein by reference in its entirety.

Each of the aforementioned references suffers from one or more drawbacks, such as failing to determine the best methodology to compensate for the stiction and determining parameters required to be adjusted to compensate for stiction without interfering with the process of control valve, thus hindering their adoption. Accordingly, it is one object of the present disclosure to provide an integrated solution including a stiction detector, a stiction quantifier, and a stiction compensator to diagnose stiction of a control valve and apply signals to compensate for the stiction in a pneumatically controlled valve system.

SUMMARY

In an exemplary embodiment, a method for compensating for stiction of an actuator of at least one control valve in a pneumatically controlled valve system is disclosed. The method includes generating, in a computing device including circuitry and program instructions stored therein that are executed by one or more processors, a digital twin model of the pneumatically controlled valve system; receiving, by the computing device, at least one current segment of data signals from a process measurement device connected to the pneumatically controlled valve system; monitoring, by the computing device, operation of the pneumatically controlled valve system by comparing the at least one current segment to the digital twin model; detecting, by the computing device, stiction when an anomaly is detected between the at least one current segment and the digital twin model; determining, by the computing device, a severity of the stiction; generating, by the computing device, instructions for a stiction control device to generate control signals to be applied to the actuator to compensate for the severity of the stiction; and displaying, by the computing device, the digital twin model of the pneumatically controlled valve system with a representation of the severity of the stiction.

In another exemplary embodiment, a system for compensating for stiction of an actuator of a controllable pneumatic valve includes a proportional-integral-derivative (PID) controller configured to receive set-point values (SP) at a PID controller input and output control signals at a PID controller output (OP); a first switch connected to the PID controller output; a stiction compensator switchably connected to the PID controller output by the first switch and configured to receive the control signals; a controllable pneumatic valve input connected to the stiction compensator and switchably connected to the PID controller by the first switch; a vibration measurement device connected to an output of the controllable pneumatic valve, the vibration measurement device configured to generate electrical signals based on an oscillation of an actuator of the controllable pneumatic valve; a process measurement device connected at an input to the output of the controllable pneumatic valve and configured to output a process variable (PV) at a process output; a feedback loop connected between the process output and the PID controller input; a computing device connected to the stiction compensator, the computing device including circuitry and program instructions stored therein that, when executed by one or more processors, cause the one or more processors apply an artificial intelligence algorithm to the electrical signals of oscillation of the controllable pneumatic valve, wherein the artificial intelligence algorithm generates sets of stiction reduction values; and wherein the stiction compensator is configured to modify the control signals based on the stiction reduction values.

In another exemplary embodiment, a non-transitory computer readable medium having instructions stored therein that, when executed by one or more processors, cause the one or more processors to perform a method for diagnosing stiction of an actuator of at least one control valve in a pneumatically controlled valve system. The method includes generating, in a computing device including circuitry and program instructions stored therein that are executed by one or more processors, a digital twin model of the pneumatically controlled valve system; receiving, by the computing device, at least one current segment of data signals from a process measurement device connected to the pneumatically controlled valve system; monitoring, by the computing device, operation of the pneumatic controlled valve system by comparing the at least one current segment to the digital twin model; detecting, by the computing device, stiction when an anomaly is detected between the at least one current segment and the digital twin model; determining, by the computing device, a severity of the stiction; generating, by the computing device, instructions for a stiction control device to generate control signals to be applied to the actuator to compensate for the severity of the stiction; and displaying, by the computing device, the digital twin model of the pneumatically controlled valve system with a representation of the severity of the stiction.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
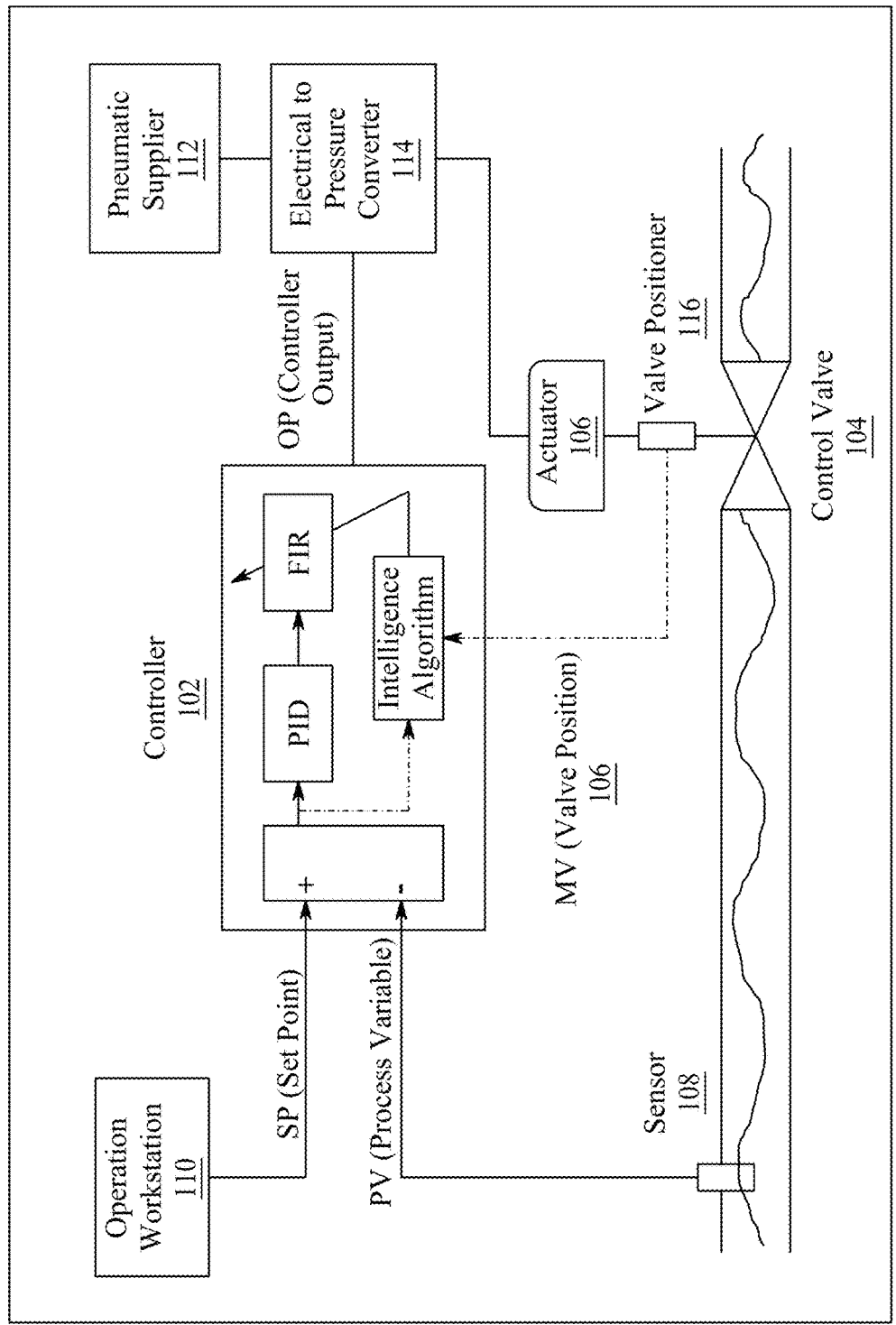
FIG. 1 depicts a schematic diagram of a pneumatically controlled valve system, according to exemplary aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a method and a system for compensating for stiction of actuator included in pneumatically controlled valve system. The present disclosure analyzes a segment of data signals received from a process measurement device connected to the pneumatically controlled valve system to identify a stiction of the actuator by computing a nonlinearity index and a non gaussian index and/or by using artificial intelligence and a data-based model and searching for the best model that reproduces the measured data. The present disclosure determines a severity of the stiction and generates control signals to compensate for the severity of the stiction. Quantification of the stiction is determined by a data driven model He model to quantify two parameters, the stick band, S and the jump band, J.

FIG. 1 depicts a schematic diagram of a pneumatically controlled valve system 100, according to exemplary aspects of the present disclosure.

According to aspects of the present disclosure, the pneumatically controlled valve system 100 may include a controller 102, a control valve 104, an actuator 106, a sensor 108, an operation workstation 110, a pneumatic supplier 112, an electrical to pressure converter 114, and a valve positioner 116.

In some aspects of the present disclosure, the controller 102 calculates a control signal to control the actuator 106. The sensor 108 detects output information of the pneumatically controlled valve system 100. In an aspect of the present disclosure, the sensor 108 may be a flow transmitter that detects flow information (for example, flow speed or flow amount) of substance flowing into or out of the control valve 104 actuated by the actuator 106, and outputs the flow information as the output information, i.e., process variable (PV) of the pneumatically controlled valve system 100. In another aspect of the present disclosure, the sensor 108 may be a level transmitter that detects level information (for example, height or amount) of the substance in a tank connected to the control valve 104, and outputs the level information as the output information, i.e., the process variable (PV) of the pneumatically controlled valve system 100.

In an aspect of the present disclosure, the pneumatically controlled valve system 100 may include a valve positioner 116 (e.g., a smart valve) that detects a valve position (MV) of the control valve 104 and outputs the MV of the control valve 104 as the output information of the pneumatically controlled valve system 100. The controller 102 may control the actuator 106 based on the difference between the input information and the output information measured by the valve positioner 116. This difference is fed to the controller which calculates the control signal needed to minimize the difference (error), which in turn minimizes the oscillation of the control valve output.

In some aspects of the present disclosure, when there is no valve positioner, the controller 102 may receive the output information (the PV from the sensor 108 and a set-point (SP)) from the operation workstation 110. The controller 102 may calculate the control signal, i.e. controller output (OP), to control the actuator 106 based on the difference between the PV and the SP and determine the control signals to compensate for the stiction. In an aspect of the present disclosure, the controller 102 may calculate the OP by compensating for a non-linear dynamic of the actuator 106 using a stable inverse model of the control valve 104. The non-linear dynamic of the actuator 106 may be caused by a static friction (stiction), which also causes a stick and jump valve behavior of the control valve 104.

In an aspect of the present disclosure, the controller 102 may use a finite impulse response (FIR) filter to calculate the OP. In this situation, the controller 102 optimizes parameters of a compensator such that a difference between the output information (the PV or the MV) of the pneumatically controlled valve system 100 and the SP or OP respectively is reduced. In a non-limiting example, compensator may be a finite impulse response (FIR) based model.

In an aspect of the present disclosure, the valve positioner 116 may send the MV to the controller 102 to perform an optimization process. In an aspect of the present disclosure, the valve positioner 116 may include a microprocessor (that includes, i.e., a Proportional-Integral-Derivative (PID) controller) to perform a simple control loop and perform the optimization process locally. The optimization process is performed to reduce or minimize a sum of square error, which is the difference between the OP (i.e., a PID control signal) and the MV.

The control signal (or the OP) output from the controller 102 is input to the electrical to pressure converter 114. The electrical to pressure converter 114 controls pneumatic pressure supplied from the pneumatic supplier 112 based on the OP to control the actuator 106.

In an aspect of the present disclosure, the set-point (SP) may correspond to a desired reference information, which may be predetermined values for one or more of the flow information, the level information, and the valve position. The SP may be input to the controller 102 from the operation workstation 110, for example, via a user interface of a computing device.

In an aspect of the present disclosure, the operation workstation 110 may function as a user interface of controller 102 to provide necessary instructions to the controller 102. For example, the operation workstation 110 may activate a compensation method to compensate for the non-linear dynamic of the actuator 106 as performed by the controller 102, tune settings of the parameters of the compensator of the control valve 104, and select objective functions (for example, select between a first function using a difference between SP and PV and a second function using a difference between the PID control signal, OP, and the MV) to optimize the parameters of the compensator.

In an aspect of the present disclosure, the controller 102 may be programmed to function as, for example, a linear PID controller and a FIR filter and perform a tuning algorithm to optimize the parameters of the FIR filter. The controller 102 may be further programmed to compare the PV and the SP. Furthermore, the controller 102 may be programmed to include one or more intelligence algorithms to optimize parameters of the linear PID controller and a FIR filter to eliminate or mitigate stiction.

Figure 2:
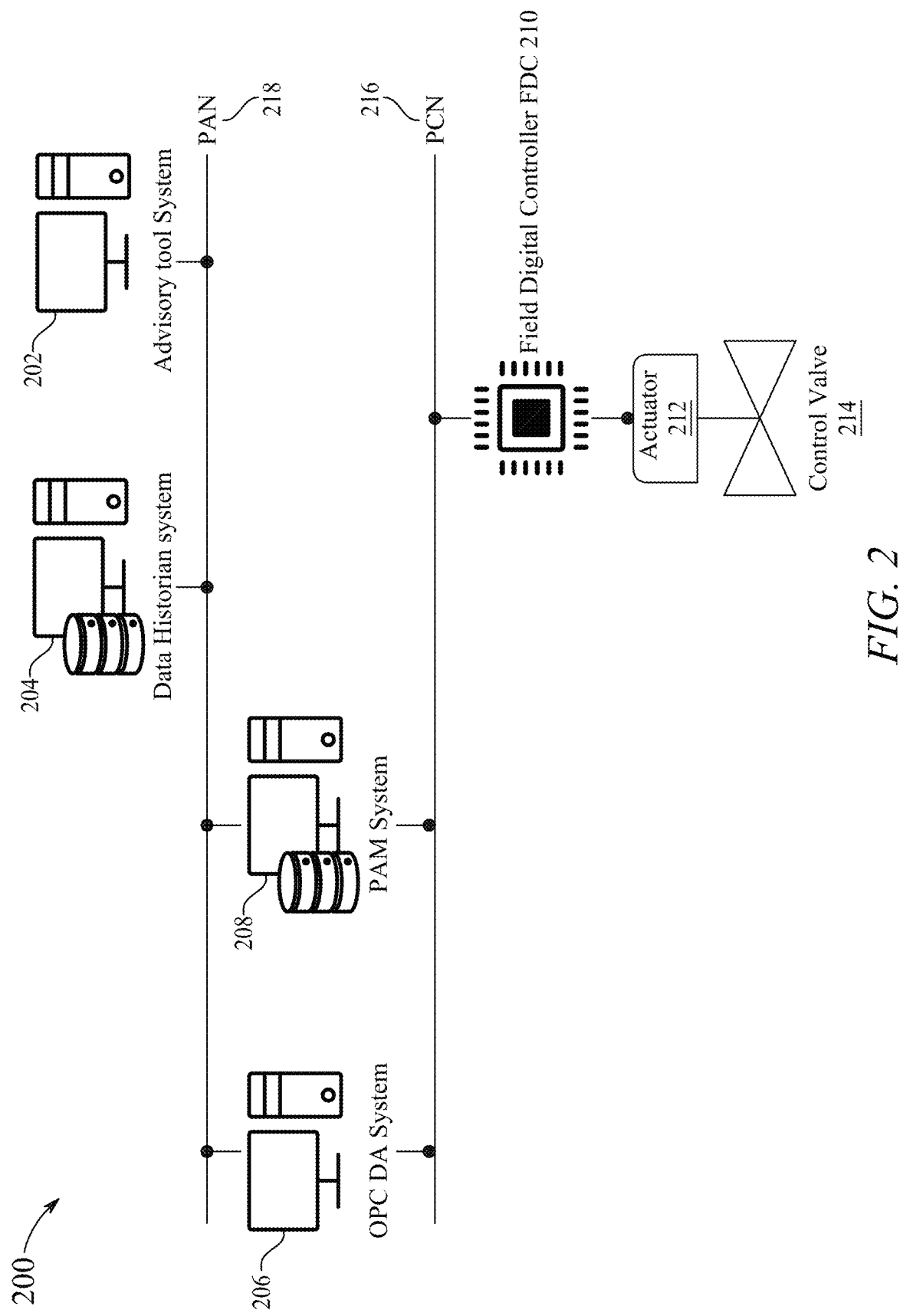
FIG. 2 depicts a network architecture for controlling the pneumatically controlled valve system, according to exemplary aspects of the present disclosure.

FIG. 2 depicts the network architecture of a system 200 for controlling a pneumatically controlled valve, according to exemplary aspects of the present disclosure.

According to aspects of the present disclosure, the system 200 may include an advisory tool system 202, a data historian system 204, open platform communications (OPC) data access (DA) system 206, plant asset management (PAM) system 208, a field digital controller (FDC) 210, an actuator 212, a control valve 214, a plant control network (PCN) 216, and a plant automation network (PAN) 218. The actuator 212 pneumatically controls the control valve 214 based on control signals received from the FDC 210. Although FIG. 2 illustrates system 200 including a single actuator 212 and corresponding control valve 214, the system 200 may include a plurality of control valves and corresponding actuators.

In some aspects of the present disclosure, the advisory tool system 202 may access various types of data to detect a non-linear dynamic of the actuator 212. The non-linear dynamic of the actuator 212 may be caused by a stiction, which may also cause a stick and jump valve behavior of the control valve 214. In some aspects of the present disclosure, the advisory tool system 202 may quantify the stiction. The advisory tool system 202 may determine a level or severity of stiction based on predetermined thresholds levels. In some aspects of the present disclosure, the advisory tool system 202 may propose an appropriate compensation method to compensate for the stiction. In an aspect of the present disclosure, the advisory tool system 202 may provide an intuitive user interface for data visualization.

In some aspects of the present disclosure, the data historian system 204 may collect production and process data from across the plant and store the data in a time series database.

In some aspects of the present disclosure, the OPCDA system 206 provides access to real-time data from various field instruments, such as control valves, actuators, sensors, valve positioner, programmable logic controllers, etc., across the plant. OPC DA refers to a group of client-server standards that provides specifications for communicating the real-time data from various data acquisition devices across the plant such as programmable logic controllers (PLCs) to display and interface devices, such as Human-Machine Interfaces (HMI) and SCADA systems.

In some aspects of the present disclosure, the PAM system 208 may provide data such as operating parameters and technical specifications associated with various field instruments, such as control valves, actuators, sensors, valve positioner, programmable logic controllers, etc. that are part of the plant.

In some aspects of the present disclosure, the FDC 210 may generate the control signal (i.e., the controller output (OP)) for the actuator 212 to pneumatically actuate the control valve 214. The FDC 210 may include I/O ports interface. The I/O ports interface may be connected to the PCN 216 to exchange data with the OPC DA system 206, the data historian system 204, and the advisory tool system 202. The I/O ports interface may be connected to various field instruments in the plant, such as the control valve (104, 214), the actuator (106, 212), the sensor 108, the valve positioner 116, the pneumatic supplier 112, and the electrical-to-pressure converter 114 using various industrial automation communication protocols, such as Highway Addressable Remote Transducer (HART) communication protocol and/or Fieldbus protocols standardized as IEC 61158. The FDC 210 may include one or more processors, memory devices, and communication interfaces. The communication interfaces may send and/or receive signals that carry digital data streams representing various types of information, such as the OP, the PV, the MV, and the SP. In an aspect of the present disclosure, FDC 210 may be programmed to function as, for example, a linear PID controller and a FIR filter, and perform a tuning algorithm to optimize parameters of the FIR model used for compensating for the non-linear dynamic motion of the actuator (106, FIG. 1 or 212, FIG. 2).

In some aspects of the present disclosure, the PCN 216 provides a communication link between the FDC 210, the OPC DA system 206, and the PAM system 208.

In some aspects of the present disclosure, the PAN 218 provides a communication link between the OPC DA system 206, the PAM system 208, the data historian system 204, and the advisory tool system 202.

Figure 3A:
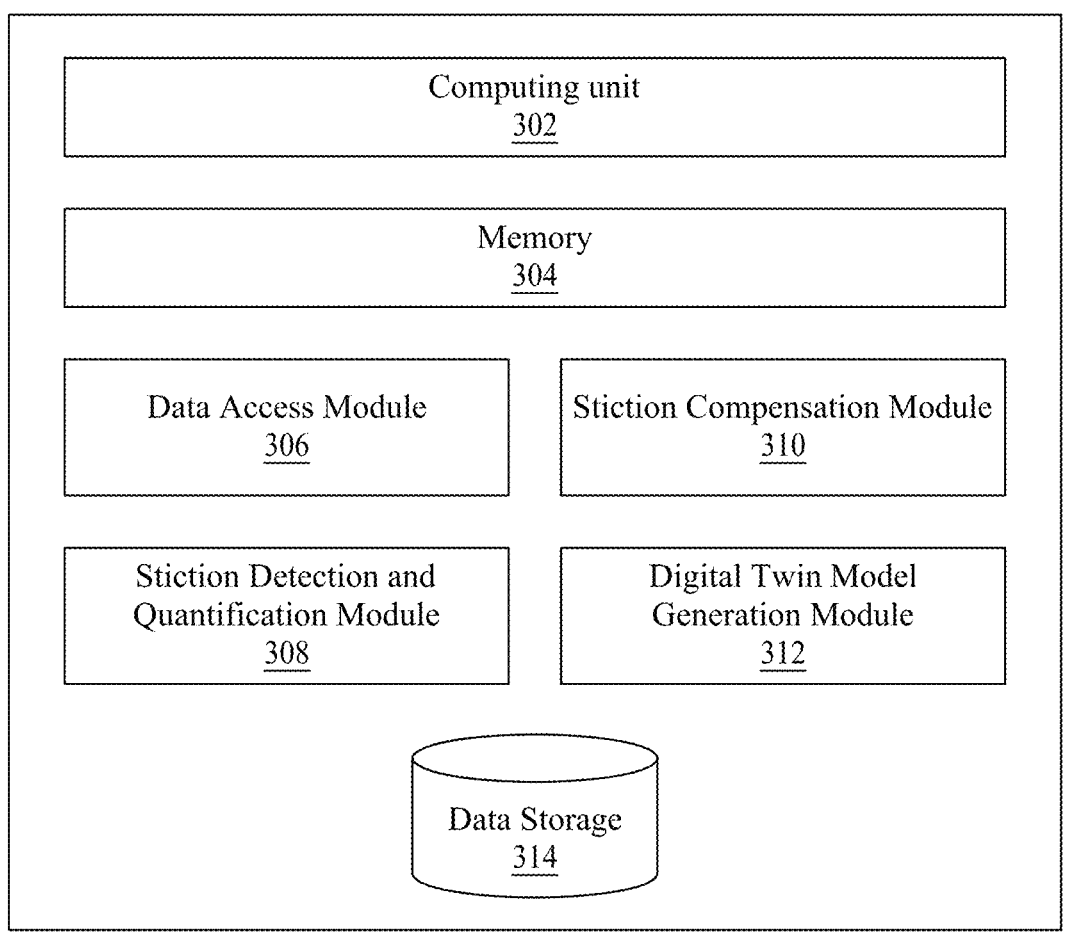
FIG. 3A depicts a schematic diagram of an advisory tool, according to exemplary aspects of the present disclosure.

FIG. 3A depicts a schematic diagram 300A of the advisory tool system 202, according to exemplary aspects of the present disclosure.

According to aspects of the present disclosure, the advisory tool system 202 may include a computing unit 302 and a memory 304. The computing unit 302 may be implemented as one or more microprocessors, microcomputers, microcontrollers, digital signal processors, central processing units, graphical processing units, state machines, logic circuitries, and/or any devices that manipulate signals based on operational instructions. Among other capabilities, the computing unit 302 may be configured to fetch and execute computer-readable instructions stored in the memory 304. In an aspect of the present disclosure, the memory 304 may include any computer-readable medium known in the art including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes. The memory 304 may be capable of storing data and allowing any storage location to be directly accessed by the computing unit 302.

According to aspects of the present disclosure, the advisory tool system 202 may also include a data access module 306, a stiction detection and quantification module 308, a stiction compensation module 310, a digital twin model generation module 312, and a data storage 314. The digital twin model generates a mirror model of the valve(s), which is used to run compensation routines to determine the optimum stiction control signal.

The data access module 306 may access real-time data, such as the PV (flow information or level information), the MV, the SP, and the OP. In an aspect of the present disclosure, the advisory tool system 202 may directly access the real-time data from various field instruments across the plant using various communication protocols. In a non-limiting example, the communication protocol may be a HART™ communication protocol. The HART™ Protocol is a global standard for sending and receiving digital information across analog wires between smart devices and control or monitoring systems. In another non-limiting example, the communication protocol may be a Foundation Fieldbus™, which is an all-digital, serial, two-way communications system that serves as the base-level network in a plant or factory automation environment. It is targeted for applications using basic and advanced regulatory control, and for much of the discrete control associated with those functions.

In an aspect of the present disclosure, the data access module 306 may access the real-time data using the OPCDA system 206. In an aspect of the present disclosure, the data access module 306 may access archived or historic data from the data historian system 204. In an aspect of the present disclosure, the data access module 306 may access data stored in relational database management system using Structured Query Language (SQL) or directly access data stored in various file formats, such as MS Excel® Workbook (.xlsx) file format, comma-separated values (.csv) file format, and text (.txt) file format. The data access module 306 may access field digital data from the PAM system 208. The advisory tool system 202 may be integrated in one or more field instruments to directly access real-time data associated with the field instruments. For example, the advisory tool system 202 may be integrated in the valve positioner 116 to directly access real-time valve position of the control valve (104, 214).

According to aspects of the present disclosure, the stiction detection and quantification module 308 may detect the non-linear dynamic of the actuator (106, 212) caused by static friction (stiction), which may also cause a stick (S) and jump (J) valve behavior of the control valve (104, 214). The stiction detection and quantification module 308 may receive, via the data access module 306, a current segment of data signals from one or more process measurement devices connected to the control valve 214. The current segment of data signals may include one or more of the PV, the MV, and the OP. The one or more process measurement devices may correspond to various field instruments, such as the sensor 108, the valve positioner 116, and the controller 102. Further, the stiction detection and quantification module 308 may receive a historic segment of data signals via the data access module 306. In an aspect of the present disclosure, the historic segment of data signals may be stored in the data historian system 204. The historic segment of data signals may correspond to value of data signals recorded by the one or more process measurement devices in the past. In an aspect of the present disclosure, the historic segment of data signals may correspond to a value of data signals that are desired or considered ideal for the operation of the pneumatically controlled valve system 100, and may be used to identify potential setpoint (SP) values. For example, the historic segment of data signals may correspond to previously recorded values of process measurements, such as the MV, the PV, and the OP, which are considered as a reference for the operation of the pneumatically controlled valve system 100. The stiction detection and quantification module 308 may monitor the pneumatically controlled valve system by comparing the current segment of data signals with the digital twin model. The stiction detection and quantification module 308 may detect the stiction of the actuator (106, 212) when an anomaly is detected between the current segment and the digital twin model. For example, the stiction detection and quantification module 308 may detect the stiction of the actuator (106, 212) using an AI-based procedure that identifies the best stiction model, or when nonlinearity and Gaussian indices are above a certain threshold.

According to aspects of the present disclosure, the stiction detection and quantification module 308 may quantify the stiction by determining the severity of stiction. In an aspect of the present disclosure, the severity of stiction may be represented using multiple levels, for example, low, moderate, and high. The levels of severity may be predetermined based on an AI-based algorithm that identifies the stiction levels that best fit the observed data. If i) the amount or magnitude of stiction is less than or equal to the values of S or J estimated by the stiction model, the severity of stiction may be determined as low, ii) if the amount or magnitude of stiction is greater than the value of S and less than the value of J (or the converse), the severity of stiction may be determined as moderate, and iii) if the amount or magnitude of variation is greater than the values of S and J, the severity of stiction may be determined as high. The first threshold value and the second threshold value may be determined by an operator based on one or more of: industry best-practices, technical specifications of various components such as the field instruments of the pneumatically controlled valve system 100, operating conditions of the pneumatically controlled valve system 100, and a desired output from the plant comprising the pneumatically controlled valve system 100.

In an aspect of the present disclosure, the stiction detection and quantification module 308 may cluster the current segment. Further, the stiction detection and quantification module 308 may determine operating points around the clusters of the current segment from the digital twin model. The stiction detection and quantification module 308 may detect the distances between the operating points and the clusters of the current segment.

According to aspects of the present disclosure, the digital twin model generation module 312 may generate a digital twin model (or a simulation model) of the pneumatically controlled valve system 100. The digital twin model may be presented on a display device associated with the advisory tool system 202. The digital twin model may provide a visual display of all components and field instruments that are part of the pneumatically controlled valve system 100. In an aspect of the present disclosure, the digital twin model may provide a visual indication of the severity level of stiction. For example, the digital twin model may indicate low stiction with green color, moderate stiction with yellow color, and high stiction with red color. The digital twin model may also visually indicate values of process measurements, such as the PV, the MV, the SP, and the OP on the user interface. The digital twin model may allow the advisory tool system 202 to adaptively optimize and tune the operating parameters to compensate for the stiction without interfering with the operation of the pneumatically controlled valve system 100.

In an aspect of the present disclosure, the digital twin model may be provided to an adaptable data display allowing the operator to zoom in and out of any display data and the field instruments. For example, the operator may zoom-in to any data or field instrument displayed by the digital twin model to get a detailed analysis associated with that data or field instrument. In an aspect of the present disclosure, the digital twin model generation module 312 may retrieve operating parameters and technical specifications associated with various field instruments from the PAM system 208 and provide them to be displayed on the digital twin model.

In an aspect of the present disclosure, the user interface of the digital twin model may be appropriately designed or reconfigured to suit the requirements of the operator. In an aspect of the present disclosure, the digital twin model may collectively provide a visual display of a plurality of pneumatically controlled valve systems which may be part of a production plant.

According to aspects of the present disclosure, the stiction compensation module 310 may determine an appropriate compensation method to compensate for the stiction of the actuator (106, 212). The stiction compensation module 310 may generate instructions for the FDC 210 to generate control signals to be applied to the actuator (106, 212) to compensate for the stiction.

In an aspect of the present disclosure, the stiction compensation module 310 may use several methods to compensate for the stiction. The stiction compensation module 310 may directly provide instructions to the FDC 210 to implement a suitable compensation technique or recommend a suitable compensation technique to the operator. To compensate for the stiction, the stiction compensation module 310 may use various compensation techniques such as i) linear compensation, ii) non-linear compensation, iii) PID outer loop compensation, and iv) PID inner loop compensation.

In the linear compensation technique, the stiction compensation module 310 identifies a best FIR model that approximates the non-linear behavior of the stiction. The best FIR model may be identified using archived data or from the real-time data, such as the PV, the MV, the SP, and the OP from various field instruments in the pneumatically controlled valve system 100. In an aspect of the present disclosure, when the best FIR model is identified using the real-time data, the digital twin model generation module 312 may build a digital twin model of the control process in order not to alter the control process during the search for the best FIR filter model. Responsive to arriving at convergence of the parameters for the best FIR filter model, the stiction compensation module 310 may trigger the FDC 210 to generate the control signals based on the parameters of the best FIR filter model to compensate for the stiction.

In an aspect of the present disclosure, the stiction compensation module 310 may apply the current segment to a FIR filter model. The stiction compensation module 310 may determine a set of FIR filter parameters which converge a FIR filter output to reduce oscillation level created by the presence of the stiction. The stiction compensation module 310 may instruct the FDC 210 to generate the control signals based on the FIR filter parameters to compensate for the stiction.

In the non-linear compensation technique, the stiction compensation module 310 may apply differential evolution to the current segment and/or the digital twin model. Based on the application of differential evolution, the stiction compensation module 310 may identify a best data-driven stiction data model that represents the stiction. The stiction compensation module 310 may generate a non-linear inverse model (NIM) of the best data-driven stiction data model. The stiction compensation module 310 may instruct the FDC 210 to generate the control signals based on the non-linear inverse model to compensate for the stiction.

In an aspect of the present disclosure, the NIM may be identified from the archived data or from the real-time data. In response to the NIM being identified using the real-time data, the digital twin model generation module 312 may build a digital twin model of the control process in order not to alter the control process during the identification of the NIM. The stiction compensation module 310 may, immediately or when the operator gives the command, trigger the FDC 210 to generate the control signals based on the NIM to compensate for the stiction. In an aspect of the present disclosure, the stiction compensation module 310 may also combine a dual identification of FIR filter preceded by the NIM to get an inverse Wiener-Hammerstein like model of the stiction.

In the PID outer loop compensation technique, the stiction compensation module 310 uses differential evolution to determine the best outer loop PID control gains that reduce the effect of the stiction. The stiction compensation module 310 may use differential evolution on real-time data or archived data to determine the control gains. When real-time data is used to determine the control gains, the digital twin model generation module 312 may generate a digital twin model of the control process in order not to alter the process during the determination of the best outer loop PID control gains. Responsive to arriving at convergence of the parameters for the best outer loop PID control gains, the stiction compensation module 310 may immediately or when the operator gives the command, trigger the FDC 210 to generate the control signals based on the parameters of the best outer loop PID control gains to compensate for the stiction.

In an aspect of the present disclosure, the stiction compensation module 310 may apply differential evolution to the current segment and/or the digital twin model. Based on the application of differential evolution, the stiction compensation module 310 may identify a best PID outer loop control gain which reduces the severity of the stiction. The stiction compensation module 310 may instruct the FDC 210 to apply the best PID outer loop control gain to a PID outer loop to compensate for the stiction.

In the PID inner loop compensation technique, the stiction compensation module 310 uses differential evolution to determine a best inner loop PID control gains that reduce the effect of the stiction. The stiction compensation module 310 may use differential evolution on real-time data or archived data to determine the control gains. When real-time data is used to determine the control gains, the digital twin model generation module 312 may generate a digital twin model of the control process in order not to alter the process during the determination of the best inner loop PID control gains. Responsive to convergence of the parameters for the best inner loop PID control gains, the stiction compensation module 310 may immediately or when the operator gives the command, trigger the FDC 210 to generate the control signals based on the parameters of the best inner loop PID control gains to compensate for the stiction.

In an aspect of the present disclosure, the stiction compensation module 310 may apply differential evolution to the current segment and/or the digital twin model. Based on the application of differential evolution, the stiction compensation module 310 may identify a best PID inner loop control gain which reduces the severity of the stiction. The stiction compensation module 310 may instruct the FDC 210 to apply the best PID inner loop control gain to a PID inner loop to compensate for the stiction.

In an aspect of the present disclosure, the digital twin model generation module 312 may generate a digital twin model of the pneumatically controlled valve system 100. The stiction compensation module 310 may compensate for the stiction by applying: i) the control signals generated based on the parameters of the best FIR filter model to the digital twin model, ii) the control signals generated based on the NIM to the digital twin model, iii) the control signals generated based on the best PID outer loop control gain to the digital twin model, and iv) the control signals generated based on the best PID inner loop control gain to the digital twin model. The stiction compensation module 310 may determine which of: i) the control signals based on the parameters of the best FIR filter model, ii) the control signals based on the NIM, iii) the control signals based on the best PID outer loop control gain, and iv) the control signals based on the best PID inner loop control gain has a greatest effect on compensating (or reducing) the stiction of the digital twin model. The stiction compensation module 310 may instruct the FDC 210 to apply the control signals which have the greatest effect in compensating (or reducing) the stiction of the digital twin model to the actuator (106, 212) of the pneumatically controlled valve system 100. Thus, the stiction compensation module 310 may select the best suitable compensation technique to compensate for stiction in the pneumatically controlled valve system 100.

In some aspects of the present disclosure, the stiction compensation module 310 may compare the different compensation techniques: i) the linear compensation, ii) non-linear compensation, iii) PID outer loop compensation, and iv) PID inner loop compensation. The operator may select criteria for comparing the different compensation techniques. The criteria may include one or more of: time response, load vs. set-point change response, variability of output, level of control, and oscillation amplitude. In an aspect of the present disclosure, the operator may assign a weightage to the one or more criteria for comparing the different compensation techniques. The stiction compensation module 310 may compute a weighted average score of criteria for each compensation technique. The stiction compensation module 310 may recommend or use the compensation technique having the highest score to compensate for the stiction.

According to some aspects of the present disclosure, the stiction compensation module 310 may determine a residual life of the control valve (104, 214). The stiction compensation module 310 may receive threshold limits $F_d$ and $F_s$ of the current segment of data signals. The threshold limits $F_d$ and $F_s$ may be stored in the data storage 314. The threshold limits $F_d$ and $F_s$ may be entered by the operator based on company/industry standards. The stiction compensation module 310 may determine if the current segment is within the threshold limits. The stiction compensation module 310 may determine the severity of the stiction by comparing the distance of the current segment to the threshold limits. The stiction compensation module 310 may determine a residual life of the control valve (104, 214) based on the distance of the current segment to the threshold limits.

Figure 3B:
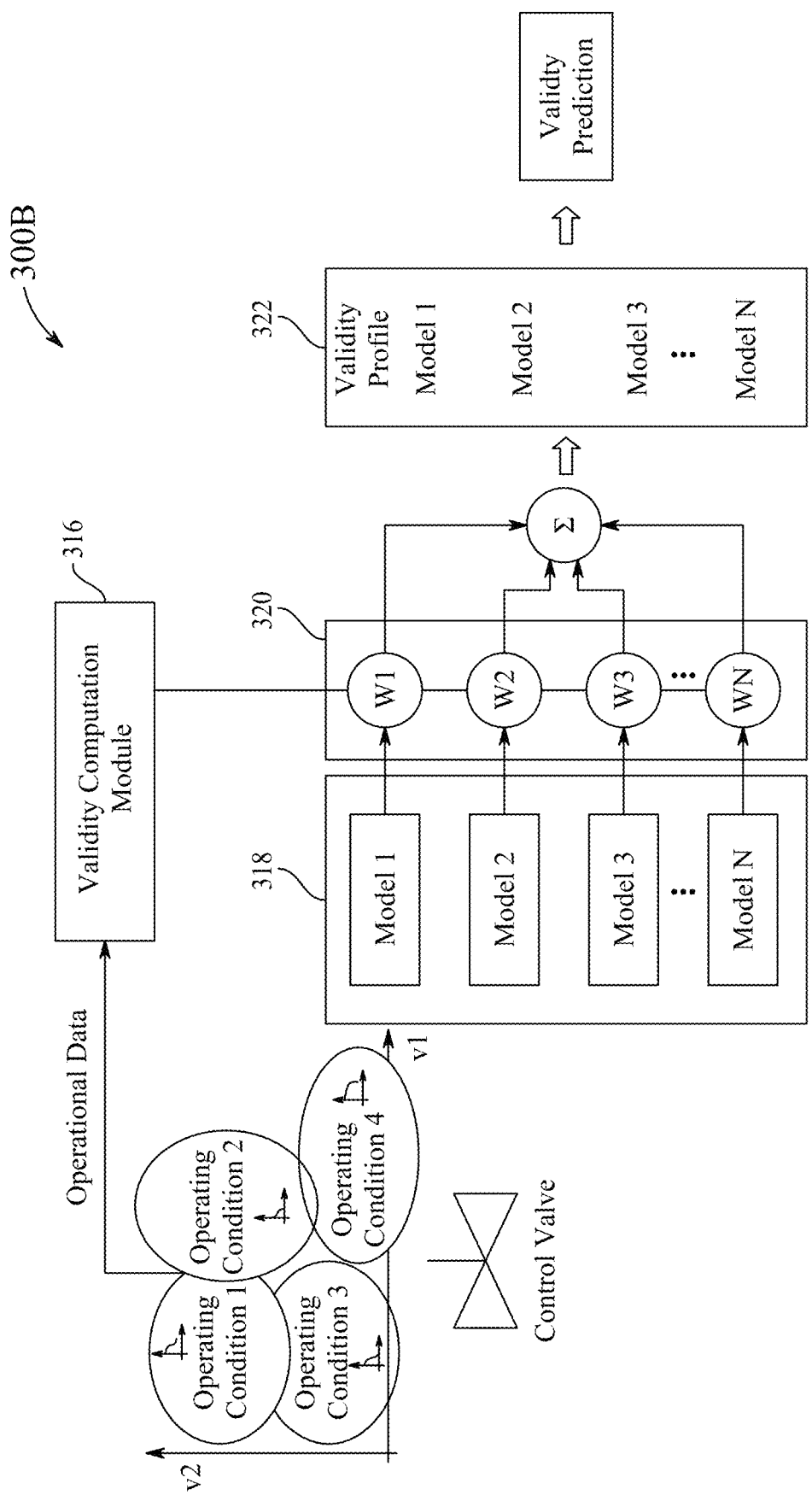
FIG. 3B depicts a schematic diagram of a multi-model methodology to determine a residual life of control valve, according to exemplary aspects of the present disclosure.

FIG. 3B depicts a schematic diagram 300B of a multi-model methodology to determine a residual life of the control valve (104, 214), according to exemplary aspects of the present disclosure.

The stiction compensation module 310 may use the multi-model methodology to determine the residual life of the control valve (104, 214). In the multi-model methodology, a validity computation module 316 may receive operational data associated with the control valve (104, 214). The operational data may be received from one or more of, the sensor 108, the valve positioner 116, and the controller 102. The validity computation module 316 may generate a plurality of submodels 318 (Model 1, Model 2, Model 3, . . . Model N) based on the operational data. In an aspect of the present disclosure, the operational data is categorized through at least one of a K-means clustering and a C-means clustering to generate the plurality of submodels 318.

The plurality of submodels 318 may be valid for different operating conditions or operating modes of the control valve (104, 214). The plurality of submodels 318 may correspond to a normal mode of operation (Model 1) and a plurality of faulty modes of operation (Model 2, Model 3, . . . Model N)

of the control valve (104, 214). Each of the plurality of submodels 318 (Model 1, Model 2, Model 3, . . . Model N) may have a respective weight or validity 320 (W1, W2, W3, . . . WN) and a respective sub-output.

The validity computation module 316 may determine a weighted sum of the sub-outputs of the plurality of submodels 318 to generate a validity profile 322 of the control valve (104, 214). The validity profile 322 may be indicative of the mode of operation of the control valve (104, 214) at a given time, and the mode of operation may include the normal mode of operation and one or more of the plurality of faulty modes of operation. The validity profile 322 is generated through a constrained Kalman Filter (KCF) based multi-model fault detection and diagnosis (FDD).

A failure of the control valve (104, 214) may be determined based on a prediction of the validity profile 322. In an aspect of the present disclosure, the stiction compensation module 310 may estimate the residual life of the control valve (104, 214) based on the prediction of the validity profile 322.

Figure 3C:
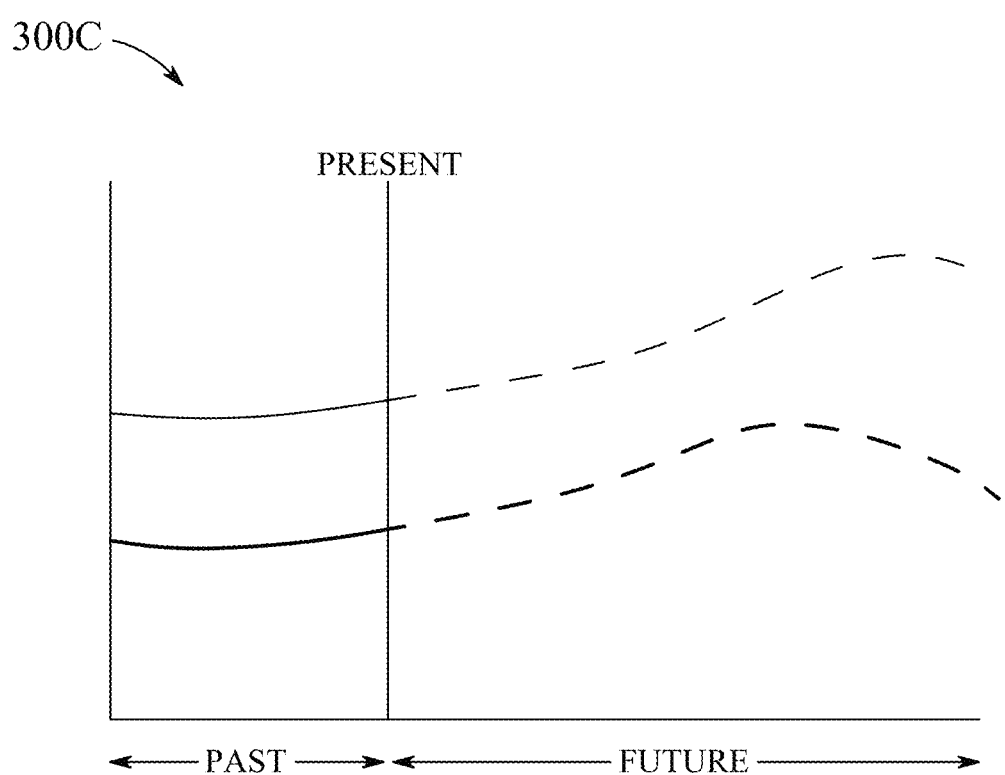
FIG. 3C depicts a graphical diagram illustrating residual life of control valve, according to exemplary aspects of the present disclosure.

FIG. 3C depicts a graphical diagram 300C illustrating the validity prediction of the residual life of the control valve (104, 214) under two different operating conditions, according to exemplary aspects of the present disclosure. The graphical diagram 300C illustrates a graph that depicts past operation of the control valve (104, 214) and the future estimation of the residual life of the control valve (104, 214) based on the prediction of the validity profile 322. The upper graph 324 shows the residual life prediction under a first operating condition and the lower graph 326 shows the residual life prediction under a second operating condition.

In an aspect of the present disclosure, the stiction compensation module 310 may apply the current segment of data signals to an artificial intelligence model trained with historic segments of data signals. The stiction compensation module 310 may adjust a set of weights of the artificial intelligence model until an output of the artificial intelligence model converges. The stiction compensation module 310 may determine a residual life of the control valve (104, 214) based on the set of the weights of the artificial intelligence model when the output of the artificial intelligence model converges. In an aspect of the present disclosure, the artificial intelligence model is a search algorithm including one of a differential evolution genetic algorithm, a particle swarm optimization and a gravitational search algorithm.

The stiction compensation module 310 may apply the current segment of data signals to a plurality of artificial intelligence models. Each of the plurality of artificial intelligence models may be trained with the historic segments of the data signals. The stiction compensation module 310 may predict a model weight for each of the plurality of artificial intelligence models which converges an output of each of the plurality of artificial intelligence models. The stiction compensation module 310 may compare the model weight for each of the plurality of artificial intelligence models to a threshold value to determine a distance of the model weight from the threshold value. The stiction compensation module 310 may estimate a residual life of the control valve (104, 214) based on the distance. Each of the plurality of artificial intelligence models is a search algorithm selected from a differential evolution genetic algorithm, a particle swarm optimization and a gravitational search algorithm.

In an aspect of the present disclosure, the parameters of the inverse model are adaptively optimized and tuned during control operation by generating a digital twin model of the plant. Generating the digital twin model enables to approximate the inverse model of the control valve and reduce all undesirable effects such as cycling as well as reduce the difference between the controller output (OP) and a desired external set-point (SP) or reference signal without interfering with the control operation. The optimization of the parameters may be performed using various intelligent evolutionary algorithms such as, but not limited to, a differential evolution (DE) algorithm, a genetic algorithm, a particle swarm optimization (PSO), a gravitational search algorithm, and an ant colony (AC).

In an aspect of the present disclosure, the differential evolution (DE) algorithm is a population based optimization technique, characterized by its simplicity, robustness, few control variables and fast convergence. Being an evolutionary algorithm, the DE technique is suited for solving non-linear and non-differentiable optimization problems. The DE algorithm is a kind of searching technique which requires a number (NP) of candidate solutions ($X_n^i$) to form the population $G^i$, where each solution consists of certain number of parameters $X_{nj}$ depending on a problem dimension.

$$G^i = [X_1, X_2, \ldots, X_{NP}] L_i \text{ generation, NP population size;} \quad (1)$$

$$X_n^i = [X_{n1}, X_{n2}, \ldots, X_{nj}] n_j \text{ problem dimension;} \quad (2)$$

The main idea in any search technique relies on generating a variant (offspring) vector solution from which a decision will be made, in order to choose the best (parent or variant). The strategy applied in DE is to use the difference between randomly selected vectors to generate a new solution. For each solution in the original population, a trail solution is generated by performing process of mutation, recombination and selection of operators. The old and new solutions are compared and the best solutions are emerged in the next generation.

In an aspect of the present disclosure, the advisory tool system 202 may provide real-time optimization of the parameters of the filter to take into account system degradation and adjust to unknown non-linear dynamics of the actuator (106, 212).

Figure 4A:
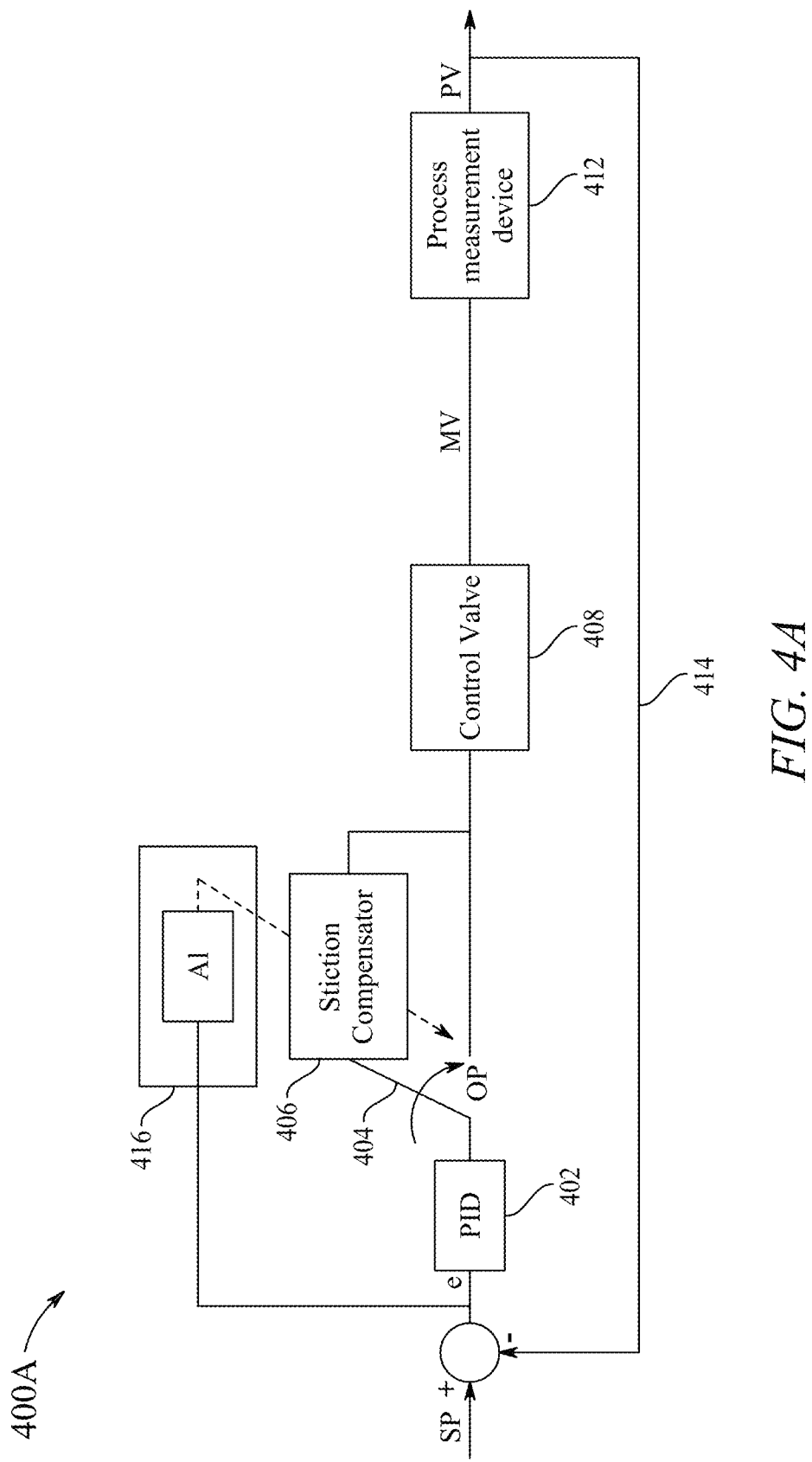
FIG. 4A depicts a stiction control system, according to exemplary aspects of the present disclosure.

FIG. 4A depicts an exemplary stiction control system 400A, according to exemplary aspects of the present disclosure. The stiction control system 400A compensates for a stiction of an actuator of a pneumatically controlled valve system.

According to aspects of the present disclosure, the stiction control system 400A may include a proportional-integral-derivative (PID) controller 402, a first switch 404, a stiction compensator 406, a control valve 408, a process measurement device 412, a feedback loop 414, and a computing device 416 which may use an artificial intelligence algorithm.

In an aspect of the present disclosure, the PID controller 402 receives set-point (SP) values at an input of the PID controller 402. The PID controller 402 outputs control signals (i.e., controller output (OP)) at an output of the PID controller. The first switch 404 is connected to the output of the PID controller 402. The stiction compensator 406 is switchably connected to the output of PID controller 402 through the first switch 404. The stiction compensator 406 receives the control signals (i.e., the OP) from the output of the PID controller 402. The input of the control valve 408 is connected to the stiction compensator 406 and switchably connected to the PID controller 402 by the first switch 404. The process measurement device 412 is connected at an input to the output of the control valve 408. The process measurement device 412 outputs a process variable (PV) at a process output. The feedback loop 414 is connected between the process output and the input of the PID controller 402. The input of the computing device 416 is connected to the input of the PID controller 402. The computing device 416 is connected to the stiction compensator 406. The computing device 416 applies an artificial intelligence algorithm to signals at the input of the PID controller 402. The artificial intelligence algorithm generates sets of stiction reduction values. The stiction compensator 406 modifies the control signals based on the stiction reduction values.

The first switch may be any one of a transistor switch, an electrically actuatable switch, a mechanical switch, or the like. In a preferred embodiment, the first switch is a transistor switch, such as an NMOS switch. For example, in FIG. 4A, the NMOS switch may have its drain connected to the PID controller 402, its source switchably connected between the stiction compensator 406 and the control valve 408 and its gate receiving gate signals from controller 102 (FIG. 1).

Figure 4B:
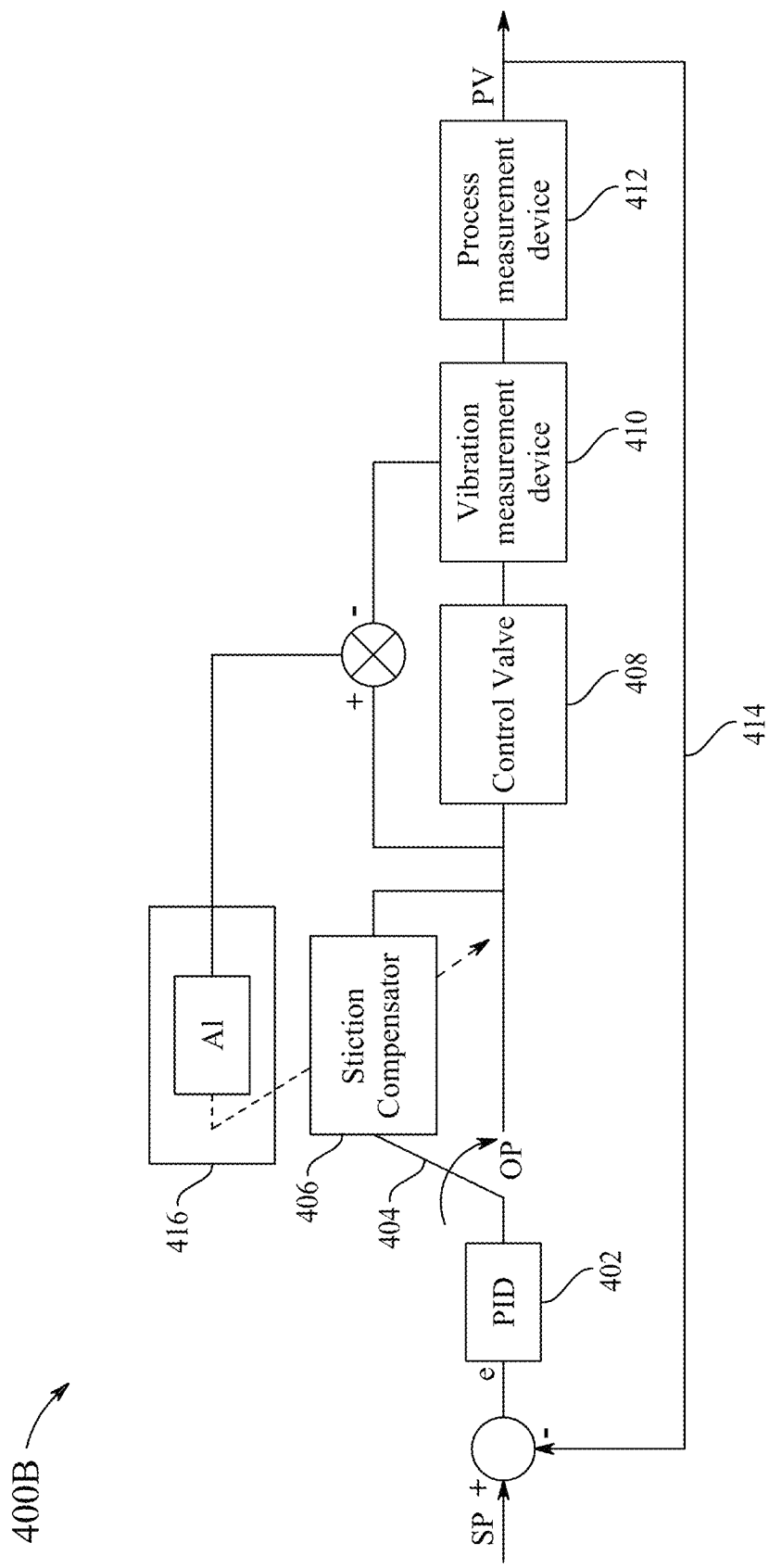
FIG. 4B depicts a stiction control system, according to exemplary aspects of the present disclosure.

FIG. 4B depicts an exemplary stiction control system 400B, according to exemplary aspects of the present disclosure. The stiction control system 400B compensates for a stiction of an actuator of a pneumatically controlled valve system.

According to aspects of the present disclosure, the stiction control system 400B may include the PID controller 402, the first switch 404, the stiction compensator 406, the control valve 408, a vibration measurement device 410, the process measurement device 412, the feedback loop 414, and the computing device 416.

In an aspect of the present disclosure, the PID controller 402 receives set-point (SP) values at an input of the PID controller 402. The PID controller 402 outputs control signals (i.e., controller output (OP)) at an output of the PID controller. The first switch 404 is connected to the output of the PID controller 402. The stiction compensator 406 is switchably connected to the output of PID controller 402 through the first switch 404. The stiction compensator 406 receives the control signals (i.e., the OP) from the output of the PID controller 402. Input of the control valve 408 is connected to the stiction compensator 406 and switchably connected to the PID controller 402 by the first switch 404. The vibration measurement device 410 is connected to an output of the control valve 408. The vibration measurement device 410 generates electrical signals based on an oscillation of an actuator of the control valve 408. The process measurement device 412 is connected at an input to the output of the control valve 408. The process measurement device 412 outputs a PV at a process output. The feedback loop 414 is connected between the process output and the input of the PID controller 402. The computing device 416 is connected to the stiction compensator 406. The computing device 416 applies an artificial intelligence algorithm to the electrical signals of oscillation of the control valve 408. The artificial intelligence algorithm generates sets of stiction reduction values. The stiction compensator 406 modifies the control signals based on the stiction reduction values.

In an aspect of the present disclosure, an input of the computing device 416 is connected in parallel with the control valve 408. In an aspect of the present disclosure, the input of the computing device 416 is connected to the input of the PID controller 402. In an aspect of the present disclosure, the computing device 416 may incorporate some or all the functionalities and features of the advisory tool system 202, the details of which have been explained with reference to FIG. 3A.

Figure 5:
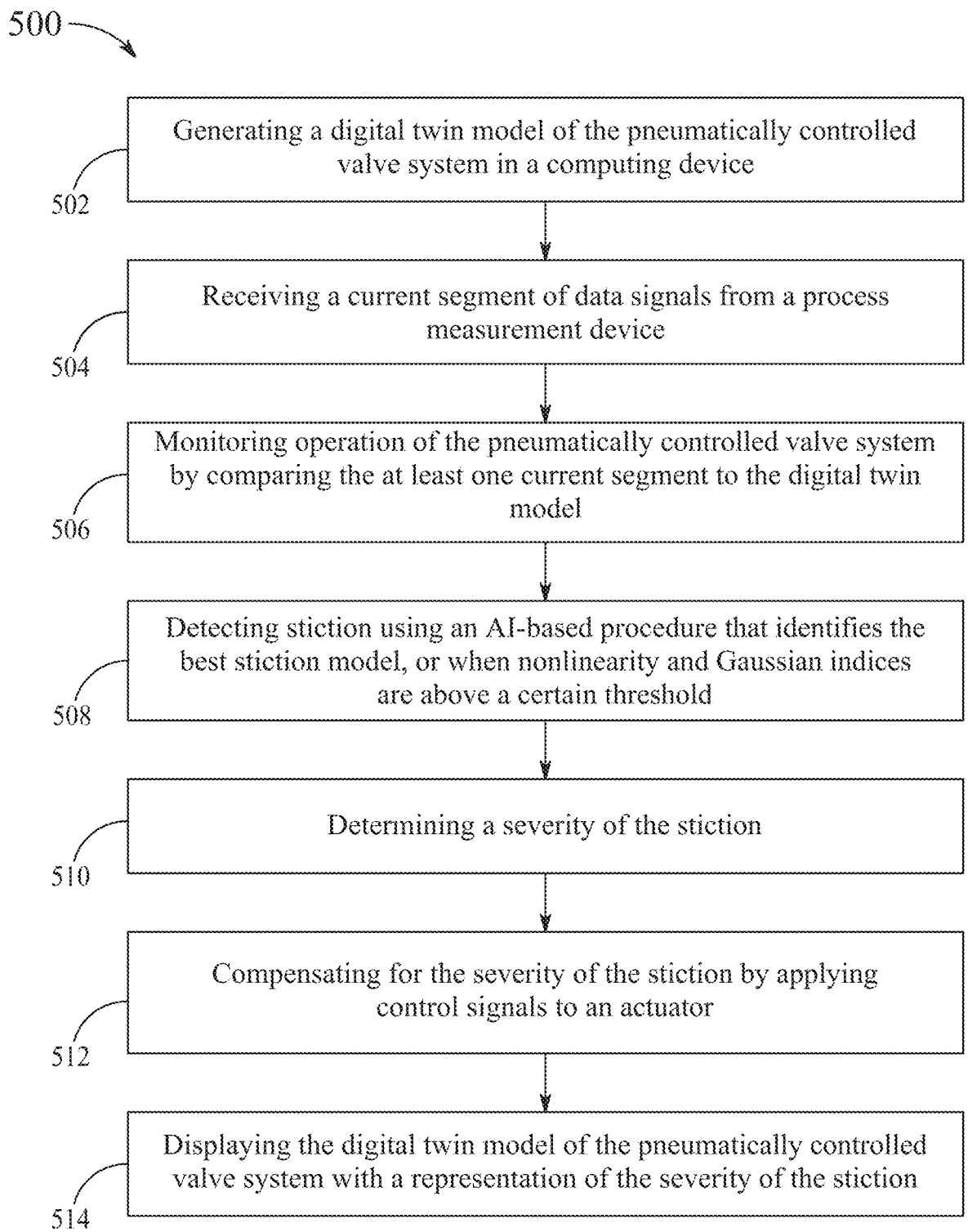
FIG. 5 is an exemplary flowchart of a method for compensating for stiction of an actuator of the pneumatically controlled valve system, according to exemplary aspects of the present disclosure.

FIG. 5 is an exemplary flowchart of method 500 for compensating for stiction of an actuator of the pneumatically controlled valve system, according to exemplary aspects of the present disclosure.

At step 502, the method 500 includes generating a digital twin model of the pneumatically controlled valve system in a computing device. The computing device includes circuitry and program instructions stored therein that are executed by one or more processors.

At step 504, the method 500 includes receiving, by the computing device, at least one current segment of data signals from a process measurement device connected to the pneumatically controlled valve system. The current segment of data signals may correspond to one or more of the process variable (PV), the valve position (MV), and the controller output (OP). The one or more process measurement devices may correspond to various field instruments, such as the sensor 108, the valve positioner 116, and the controller 102.

At step 506, the method 500 includes monitoring, by the computing device, operation of the pneumatically controlled valve system by comparing the at least one current segment to the digital twin model.

At step 508, the method 500 includes detecting, by the computing device, stiction using an AI-based procedure that identifies the best stiction model, or when nonlinearity and Gaussian indices are above a certain threshold.

At step 510, the method 500 includes determining, by the computing device, a severity of the stiction. The severity of stiction may be represented using multiple levels, for example, low, moderate, and high. The levels of severity may be predetermined based on an AI-based algorithm that identifies the stiction levels that best fit the observed data. For example, if i) the amount or magnitude of variation stiction is less than or equal to values of S or J estimated by the stiction model, the severity of stiction may be determined as low, ii) if the amount or magnitude of variation stiction is greater than the value of S and less than the value of J (or the converse), the severity of stiction may be determined as moderate, and iii) if the amount or magnitude of variation is greater than the values of S and J, the severity of stiction may be determined as high. The first threshold value and the second threshold value may be determined by an operator.

At step 512, the method 500 includes compensating, by a stiction control device, for the severity of the stiction by applying control signals to the actuator.

At step 514, the method 500 includes displaying, by the computing device, the digital twin model of the pneumatically controlled valve system with a representation of the severity of the stiction.

Figure 6:
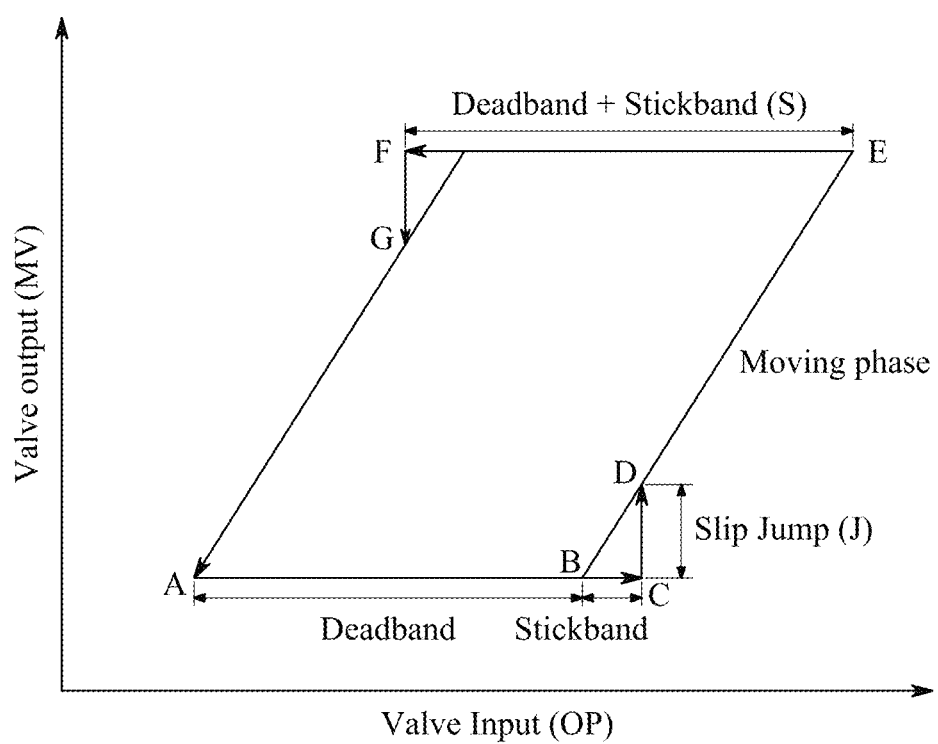
FIG. 6 depicts an input-output relation for behavior of control valves in the pneumatically controlled valve system, according to exemplary aspects of the present disclosure.

FIG. 6 depicts an input-output relation or behavior of control valves in pneumatically controlled valve system, according to exemplary aspects of the present disclosure. FIG. 6 summarizes the real process data, and describes a phase plot of the input-output behavior of a control valve suffering from stiction. The plot consists of four components: deadband, stickband, slip jump, and moving phase. Responsive to the valve coming to a rest or changing the direction at point A in the FIG. 6, the control valve sticks as it cannot overcome the force due to static friction. After the controller output (OP) overcomes the deadband (AB) and the stickband (BC) of the control valve, the control valve jumps to a new position (point D) and continues to move. Due to very low or zero velocity, the control valve may stick again in between points D and E in FIG. 6 while travelling in the same direction. In such a case, the magnitude of deadband is zero and only stickband is present. This may be overcome only if the controller output (OP) signal is larger than the stickband. The deadband and stickband represent the behavior of the control valve when it is not moving through the input to the control valve keeps changing. The slip jump phenomenon represents the abrupt release of potential energy stored in the actuator chambers due to high static friction in the form of kinetic energy as the control valve starts to move. The magnitude of the slip jump is crucial in determining the limit cyclic behavior introduced by stiction. Once the control valve jumps or slips, it continues to move until it sticks again at point E. In this moving phase, dynamic friction is present, which may be much lower than the static friction. Therefore, stiction is a property of an element such that its smooth movement in response to a varying input is preceded by a static part followed by a sudden abrupt jump called "slip-jump". "Slip-jump" may be expressed as a percentage of the output span. Its origin in a mechanical system is static friction, which exceeds the dynamic friction during smooth movement.

An experimental setup of the pneumatically controlled valve system 100 was built to study behavior of the control valve and to demonstrate the effectives of the various compensation techniques to compensate for the stiction. In the experimental setup, a single closed level loop control is used as a pilot plant, and level of water in a tank is used as the process variable (PV). The level of water in the tank is measured by a level transmitter and fed back to the controller. The controller may communicate with a human machine interface (HMI) in a personal computer, such as the advisory tool system (202, 300). The advisory tool system (202, 300) may determine the best compensation technique and instruct the controller to generate control signals to be applied to the actuator through the electrical to pressure (E/P) converter to actuate the control valve. Various components of the experimental setup of the pneumatically controlled valve system 100 is described in conjunction with FIG. 7, FIG. 8, and FIG. 9.

Figure 7:
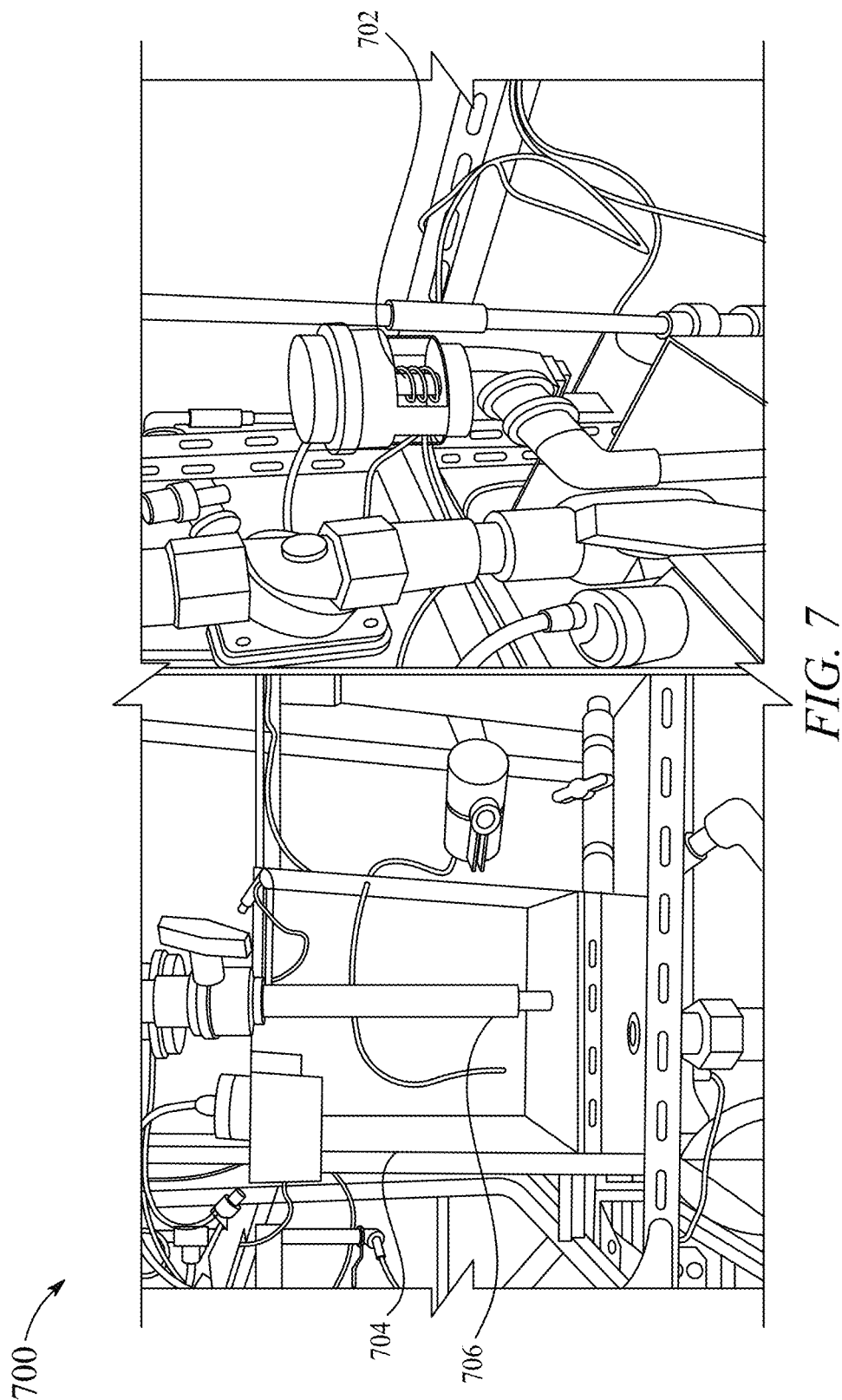
FIG. 7 depicts an exemplary experimental setup of the pneumatically controlled valve system, according to exemplary aspects of the present disclosure.

FIG. 7 depicts an exemplary experimental setup 700 of the pneumatically controlled valve system 100, according to exemplary aspects of the present disclosure. The experimental setup 700 includes a control valve 702, a tank 704, and a level transmitter 706. The level transmitter 706 may detect a level (for example, height or amount) of water in the tank 704. The level of water in the tank 704 may be used as the PV.

Figure 8:
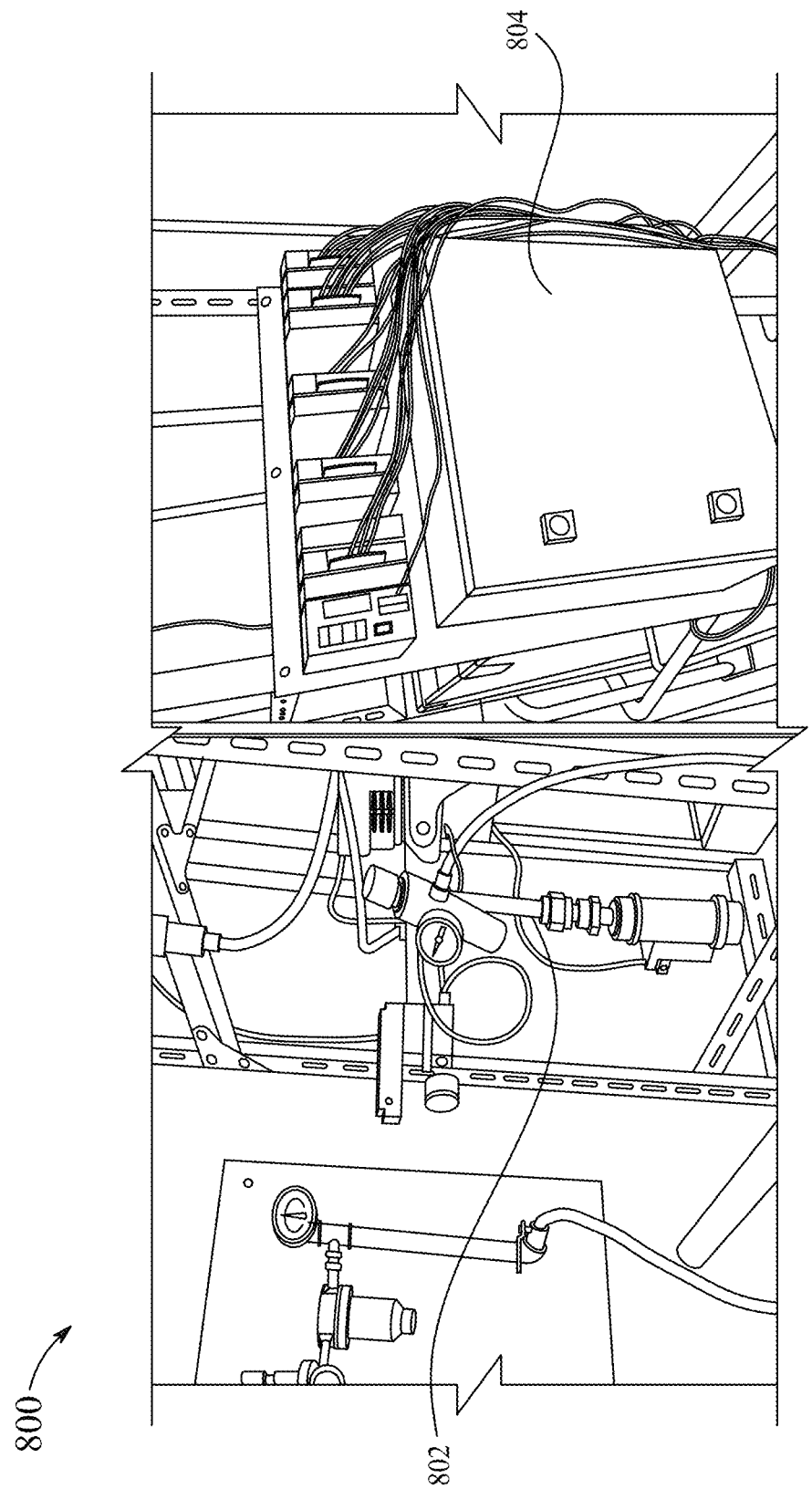
FIG. 8 depicts an exemplary experimental setup of the pneumatically controlled valve system, according to exemplary aspects of the present disclosure.

FIG. 8 depicts an exemplary experimental setup 800 of the pneumatically controlled valve system 100, according to exemplary aspects of the present disclosure. The experimental setup 800 includes an electrical-to-pressure converter 804 and a controller 804. In the experimental setup 800, the controller 804 used is a programmable automation controller, such as the Compact FieldPoint of National Instruments. The electrical-to-pressure converter 804 may use the control signals generated by the controller 804 to control pneumatic pressure to be applied to the actuator of the control valve 702.

Figure 9:
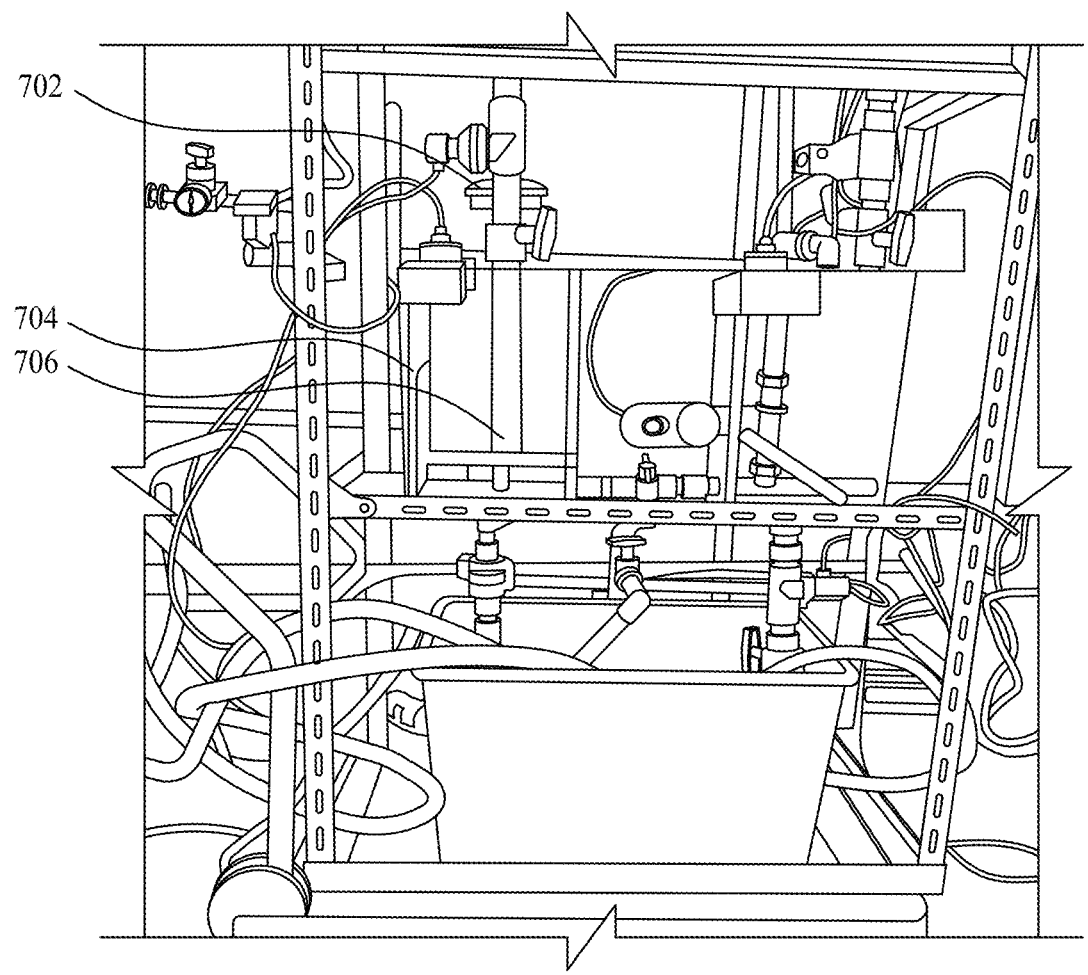
FIG. 9 depicts an exemplary experimental setup of the pneumatically controlled valve system, according to exemplary aspects of the present disclosure.

FIG. 9 depicts an exemplary experimental setup 900 of the pneumatically controlled valve system 100, according to exemplary aspects of the present disclosure. The experimental setup 900 includes, the control valve 702, the tank 704, and the level transmitter 706. Although, for the sake of brevity, the exemplary experimental setup as depicted in FIG. 7 and FIG. 9 includes a singly control valve 702, the exemplary experimental setup may be implemented at a production plant level with multiple control valves.

The first embodiment is illustrated with respect to FIGS. 1-12. The first embodiment describes a method for compensating for stiction of an actuator of at least one control valve in a pneumatically controlled valve system. The method includes generating, in a computing device including circuitry and program instructions stored therein that are executed by one or more processors, a digital twin model of the pneumatically controlled valve system; receiving, by the computing device, at least one current segment of data signals from a process measurement device connected to the pneumatically controlled valve system; monitoring, by the computing device, operation of the pneumatically controlled valve system by comparing the at least one current segment to the digital twin model; detecting, by the computing device, stiction when an anomaly is detected between the at least one current segment and the digital twin model; determining, by the computing device, a severity of the stiction; generating, by the computing device, instructions for a stiction control device to generate control signals to be applied to the actuator to compensate for the severity of the stiction; and displaying, by the computing device, the digital twin model of the pneumatically controlled valve system with a representation of the severity of the stiction.

The method further comprises comparing the at least one current segment to the digital twin model by determining, from the digital twin model, operating points around the at least one current segment by clustering; identifying stiction, by the computing device; and generating, by the computing device, instructions for the stiction control device to generate the control signals based on the stiction.

The method further comprises comparing the at least one current segment to the digital twin model by applying the at least one current segment to a Finite Impulse Response (FIR) filter model; and determining a set of FIR filter parameters which converge a FIR filter output to reduce the oscillation level created by the presence of the stiction. The method further comprises generating, by the computing device, instructions for the stiction control device to compensate for the severity of the stiction by generating the control signals based on the FIR filter parameters.

The method further comprises comparing the at least one current segment to the digital twin model by applying differential evolution to the at least one current segment and/or the digital twin model of the pneumatically controlled valve system; and identifying a best data-driven stiction data model. The method further comprises building, by the computing device, a non-linear inverse model (NIM) of the best data-driven stiction data model; and generating, by the computing device, instructions for the stiction control device to compensate for the severity of the stiction by generating the control signals based on the non-linear inverse model.

The method further comprises comparing the at least one current segment to the digital twin model by applying differential evolution to the at least one current segment and/or the digital twin model of the pneumatically controlled valve system. The method further comprises identifying, by the computing device, a best proportional-integral-derivative (PID) outer loop control gain which reduces the severity of the stiction; and generating, by the computing device, instructions for the stiction control device to compensate for the stiction by applying the best PID outer loop control gain to a PID outer loop.

The method further comprises comparing the at least one current segment to the digital twin model by applying differential evolution to the at least one current segment and to the digital twin model of the pneumatically controlled valve system. The method further comprises identifying, by the computing device, a best proportional-integral-derivative (PID) inner loop control gain which reduces the severity of the stiction; and generating, by the computing device, instructions for the stiction control device to compensate for the stiction by applying the best PID inner loop control gain to a PID inner loop.

The method further comprises comparing the at least one current segment to the digital twin model by receiving threshold limits, $F_d$ and $F_s$, of the at least one current segment; and determining whether the at least one current segment is within the threshold limits. The method further comprises determining, by the computing device, the severity of the stiction by comparing a distance of the at least one current segment to the threshold limits; and determining, by the computing device, a residual life of the control valve based on the distance of the at least one current segment to the threshold limits.

The method further comprises comparing the at least one current segment to the digital twin model by applying the at least one current segment of data signals to an artificial intelligence model trained with historic segments of data signals; and adjusting a set of weights of the artificial intelligence model until an output of the artificial intelligence model converges. The method further comprises determining a residual life of the control valve based on an estimation of a residual stiction that cannot be eliminated. Further, the artificial intelligence model is a search algorithm including one of a differential evolution genetic algorithm, a particle swarm optimization and a gravitational search algorithm.

The method further comprises comparing the at least one current segment to the digital twin model by: applying the at least one current segment of data signals to a plurality of artificial intelligence models each trained with historic segments of data signals, wherein each of the plurality of artificial intelligence models is a search algorithm selected from a differential evolution genetic algorithm, a particle swarm optimization and a gravitational search algorithm; predicting a model weight for each of the artificial intelligence models which converges an output of each artificial intelligence model; comparing the model weight for each of the artificial intelligence models to a threshold value to determine a distance of the model weight from the threshold value; and estimating a residual life of the control valve based on the distance.

Compensating for the severity of the stiction includes at least one of compensating a response time, a load versus set-point change response, a variability in a current segment, a control level, and an oscillation amplitude.

The method further comprises comparing the at least one current segment to the digital twin model by applying the at least one current segment to a Finite Impulse Response (FIR) filter model, determining a set of FIR filter parameters which converge a FIR filter output to match the at least one current segment, compensating for the severity of the stiction by generating the control signals based on the FIR filter parameters, and applying the control signals to the digital twin model; applying differential evolution to the at least one current segment of the pneumatically controlled valve system, identifying a best data-driven stiction data model, building a non-linear inverse model (NIM) of the best data-driven stiction data model and compensating for the severity of the stiction by generating the control signals based on the non-linear inverse model and applying the control signals to the digital twin model; applying differential evolution to the at least one current segment and/or the digital twin model of the pneumatically controlled valve system, identifying a best proportional-integral-derivative (PID) outer loop control gain which reduces the severity of the stiction, compensating for the stiction by applying the best PID outer loop control gain to a PID outer loop of the digital twin model The method further comprises determining which of the control signals based on the FIR filter parameters, the control signals based on the non-linear inverse model, the PID outer loop control gain and the PID inner loop control gain has a greatest effect on reducing the stiction of the digital twin model; and generating, by the computing device, instruction for the stiction control device to apply the control signals which have the greatest effect on reducing the stiction of the digital twin model to actuator of the at least one control valve.

The second embodiment is illustrated with respect to FIGS. 1-12. The second embodiment describes a stiction control system for compensating for stiction of an actuator of a controllable pneumatic valve. The system comprises a proportional-integral-derivative (PID) controller configured to receive set-point values (SP) at a PID controller input and output control signals at a PID controller output (OP); a first switch connected to the PID controller output; a stiction compensator switchably connected to the PID controller output by the first switch and configured to receive the control signals; a controllable pneumatic valve input connected to the stiction compensator and switchably connected to the PID controller by the first switch; a vibration measurement device connected to an output of the controllable pneumatic valve, the vibration measurement device configured to generate electrical signals based on an oscillation of an actuator of the controllable pneumatic valve; a process measurement device connected at an input to the output of the controllable pneumatic valve and configured to output a process variable (PV) at a process output; a feedback loop connected between the process output and the PID controller input; a computing device connected to the stiction compensator, the computing device including circuitry and program instructions stored therein that, when executed by one or more processors, cause the one or more processors apply an artificial intelligence algorithm to the electrical signals of oscillation of the controllable pneumatic valve, wherein the artificial intelligence algorithm generates sets of stiction reduction values; and wherein the stiction compensator is configured to modify the control signals based on the stiction reduction values.

An input of the computing device is connected in parallel with the controllable pneumatic valve.

A computing device input is connected to the PID controller input.

The computing device is further configured to build a digital twin model of the controllable pneumatic valve; receive at least one current segment of electrical signals based on an oscillation of the controllable pneumatic valve; monitor the operation of the controllable pneumatic valve by comparing the at least one current segment to the digital twin model; detect stiction when an anomaly is detected between the at least one current segment and the digital twin model; determine a severity of the stiction; compensate for the severity of the stiction by generating the sets of stiction reduction values; transmit the sets of stiction reduction values to the stiction compensator; and display the digital twin model of the at least one controllable pneumatic valve with a representation of the severity of the stiction.

The computing device is further configured to compare the at least one current segment to the digital twin model by applying the at least one current segment to a Finite Impulse Response (FIR) filter model and determining a set of FIR filter parameters which converge a FIR filter output to match the at least one current segment. The computing device is further configured to compensate for the severity of the stiction by generating the control signals based on the FIR filter parameters.

The computing device is further configured to compare the at least one current segment to the digital twin model by applying differential evolution to the at least one current segment and/or the digital twin model of the at least one controllable pneumatic valve; and identifying a best proportional-integral-derivative (PID) outer loop control gain which reduces the severity of the stiction. The computing device is further configured to compensate for the stiction by applying the best PID outer loop control gain to a PID outer loop.

The computing device is further configured to compare the at least one current segment to the digital twin model by applying differential evolution to the at least one current segment and/or the digital twin model of the at least one controllable pneumatic valve; and identifying a best proportional-integral-derivative (PID) inner loop control gain which reduces the severity of the stiction. The computing device is further configured to compensate for the stiction by applying the best PID inner loop control gain to a PID inner loop.

The third embodiment is illustrated with respect to FIGS. 1-12. The third embodiment describes a non-transitory computer readable medium having instructions stored therein that, when executed by one or more processors, cause the one or more processors to perform a method for diagnosing stiction of an actuator of at least one control valve in a pneumatically controlled valve system. The method comprises generating, in a computing device including circuitry and program instructions stored therein that are executed by one or more processors, a digital twin model of the pneumatically controlled valve system; receiving, by the computing device, at least one current segment of data signals from a process measurement device connected to the pneumatically controlled valve system; monitoring, by the computing device, operation of the pneumatic controlled valve system by comparing the at least one current segment to the digital twin model; detecting, by the computing device, stiction when an anomaly is detected between the at least one current segment and the digital twin model; determining, by the computing device, a severity of the stiction; generating, by the computing device, instructions for a stiction control device to generate control signals to be applied to the actuator to compensate for the severity of the stiction; and displaying, by the computing device, the digital twin model of the pneumatically controlled valve system with a representation of the severity of the stiction.

Figure 10:
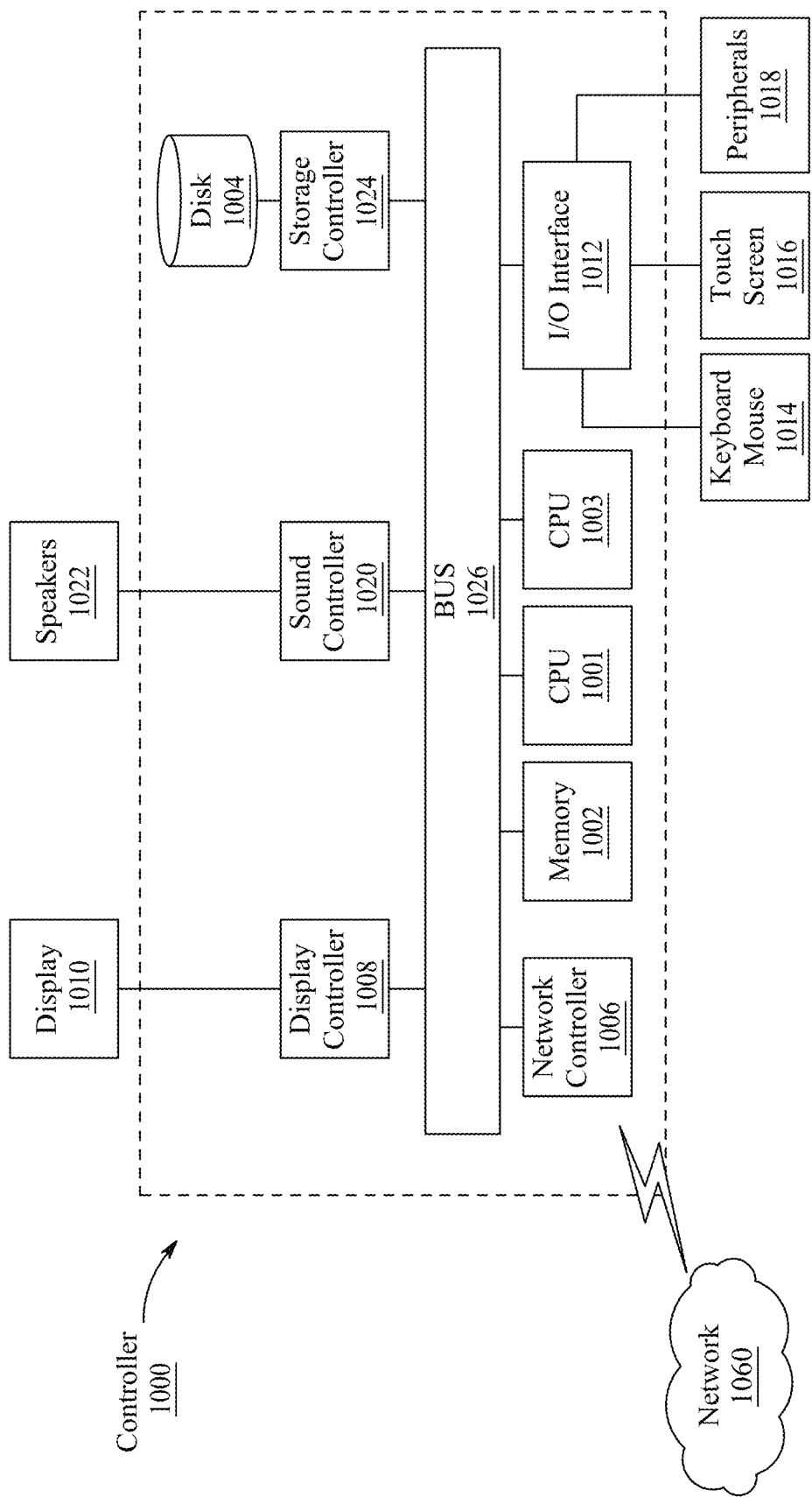
FIG. 10 is an illustration of a non-limiting example of details of computing hardware used in the computing system, according to exemplary aspects of the present disclosure.

FIG. 10 is an illustration of a non-limiting example of details of computing hardware used in the computing system, according to exemplary aspects of the present disclosure. In FIG. 10, a controller 1000 is described which is a computing device, such as the advisory tool system 202 and the computing unit 302. The controller 1000 includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1001, 1003 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 1003 may be implemented on an FPGA, ASIC, PLD or using discrete logic circuits, as one of ordinary skill in the art would recognize. Further, CPU 1001, 1003 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general-purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
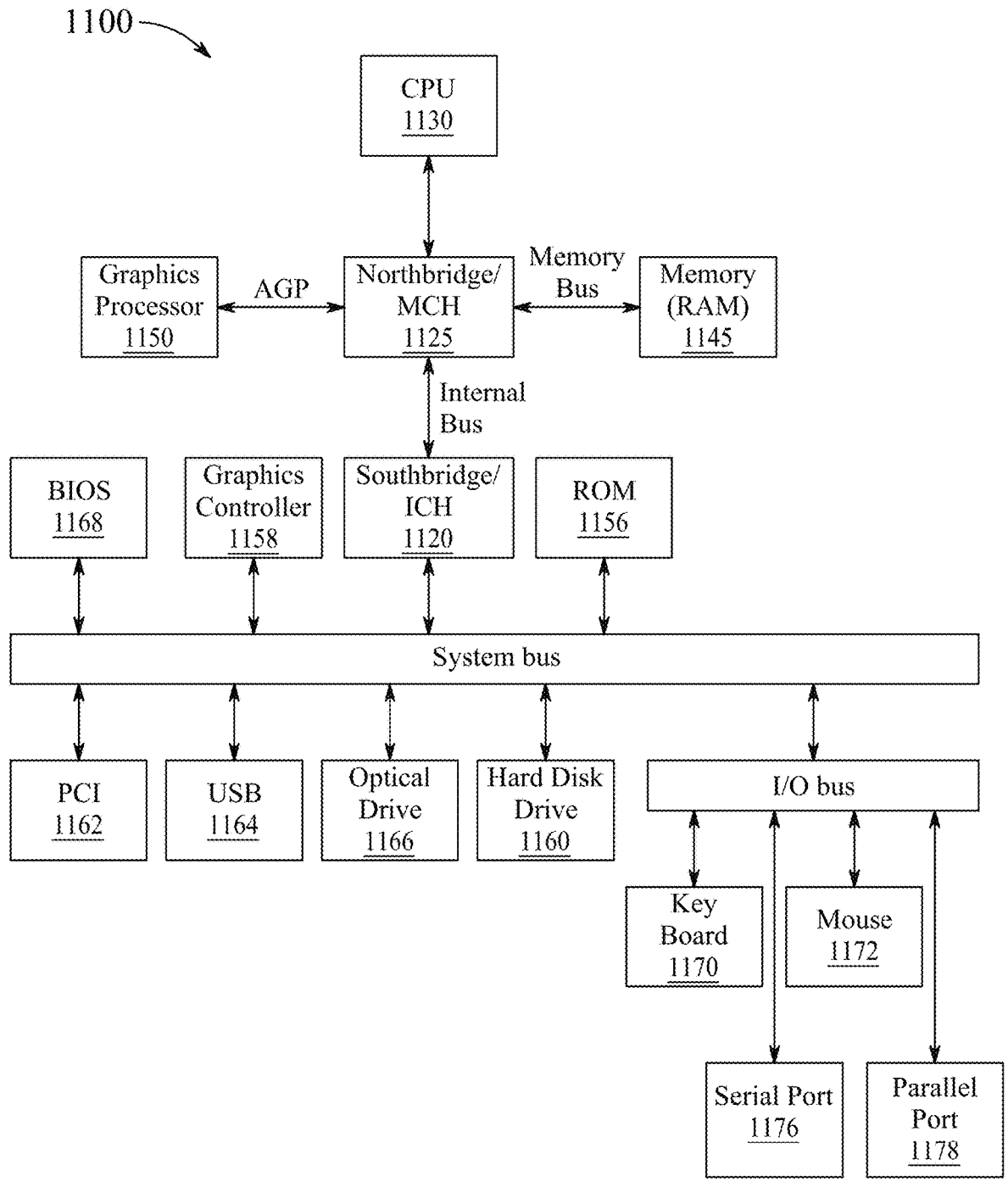
FIG. 11 is an exemplary schematic diagram of a data processing system used within the computing system, according to exemplary aspects of the present disclosure.

FIG. 11 shows a schematic diagram of a data processing system, according to certain embodiments, for performing the functions of the exemplary embodiments. The data processing system is an example of a computer in which code or instructions implementing the processes of the illustrative embodiments may be located.

In FIG. 11, data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
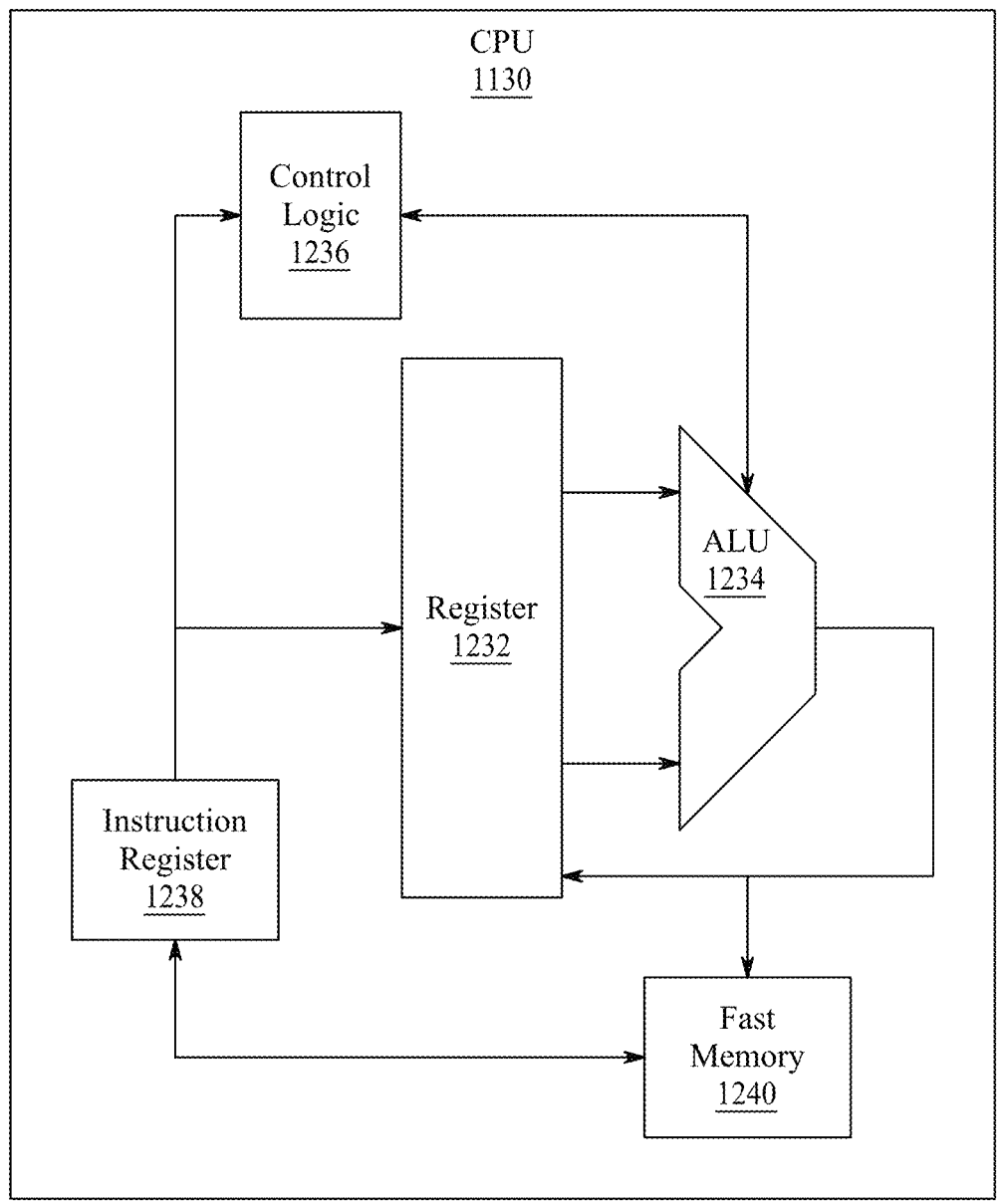
FIG. 12 is an exemplary schematic diagram of a processor used with the computing system, according to exemplary aspects of the present disclosure.

For example, FIG. 12 shows one implementation of CPU 1130. In one implementation, the instruction register 1238 retrieves instructions from the fast memory 1240. At least part of these instructions are fetched from the instruction register 1238 by the control logic 1236 and interpreted according to the instruction set architecture of the CPU 1130. Part of the instructions can also be directed to the register 1232. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain implementations, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1188 through a PCI bus 1162.

The PCI devices may include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for compensating for stiction of an actuator of at least one control valve in a pneumatically controlled valve system, comprising:
   generating, in a computing device including circuitry and program instructions stored therein that are executed by one or more processors, a digital twin model of the pneumatically controlled valve system;
   receiving, by the computing device, at least one current segment of data signals from a process measurement device connected to the pneumatically controlled valve system;
   monitoring, by the computing device, operation of the pneumatically controlled valve system by comparing the at least one current segment to the digital twin model;
   detecting, by the computing device, stiction when an anomaly is detected between the at least one current segment and the digital twin model;
   determining, by the computing device, a severity of the stiction;
   generating, by the computing device, instructions for a stiction control device to generate control signals to be applied to the actuator to compensate for the severity of the stiction; and
   displaying, by the computing device, the digital twin model of the pneumatically controlled valve system with a representation of the severity of the stiction, comparing, by the computing device, the at least one current segment to the digital twin model by:
  applying differential evolution to the at least one current segment and/or the digital twin model of the pneumatically controlled valve system;
  identifying, by the computing device, a best proportional-integral-derivative (PID) outer loop control gain and/or a PID inner loop control gain which reduces the severity of the stiction; and
  generating, by the computing device, instructions for the stiction control device to compensate for the stiction by applying the best PID outer loop control gain to a PID outer loop that controls the actuator and/or a PID inner loop that controls the actuator; and
comparing the at least one current segment to the digital twin model by:
  applying the at least one current segment of data signals to an artificial intelligence model trained with historic segments of data signals;
  adjusting a set of weights of the artificial intelligence model until an output of the artificial intelligence model converges;
  determining a residual life of the control valve based on an estimation of a residual stiction that cannot be eliminated; and
wherein the artificial intelligence model is a search algorithm including one of a differential evolution genetic algorithm, a particle swarm optimization and a gravitational search algorithm.

2. The method of claim 1, further comprising:
comparing, by the computing device, the at least one current segment to the digital twin model by:
  determining, from the digital twin model, operating points around the at least one current segment by clustering;
identifying stiction, by the computing device; and
generating, by the computing device, instructions for the stiction control device to generate the control signals based on the stiction.

3. The method of claim 1, further comprising:
comparing, by the computing device, the at least one current segment to the digital twin model by:
  applying the at least one current segment to a Finite Impulse Response (FIR) filter model;
  determining a set of FIR filter parameters which converge a FIR filter output to reduce the oscillation level created by the presence of the stiction; and
generating, by the computing device, instructions for the stiction control device to compensate for the severity of the stiction by generating the control signals based on the FIR filter parameters.

4. The method of claim 1, further comprising:
comparing, by the computing device, the at least one current segment to the digital twin model by:
  applying differential evolution to the at least one current segment and/or the digital twin model of the pneumatically controlled valve system;
  identifying a best data-driven stiction data model;
building, by the computing device, a non-linear inverse model (NIM) of the best data-driven stiction data model; and
generating, by the computing device, instructions for the stiction control device to compensate for the severity of the stiction by generating the control signals based on the non-linear inverse model.

5. The method of claim 1, further comprising:
comparing, by the computing device, the at least one current segment to the digital twin model by:
  receiving first and second threshold limits of the at least one current segment;
  determining whether the at least one current segment is within the threshold limits;
determining, by the computing device, the severity of the stiction by comparing a distance of the at least one current segment to the threshold limits; and
determining, by the computing device, a residual life of the control valve based on the distance of the at least one current segment to the threshold limits.

6. The method of claim 1, comprising comparing the at least one current segment to the digital twin model by:
  applying the at least one current segment of data signals to a plurality of artificial intelligence models each trained with historic segments of data signals, wherein each of the plurality of artificial intelligence models is a search algorithm selected from a differential evolution genetic algorithm, a particle swarm optimization and a gravitational search algorithm;
  predicting a model weight for each of the artificial intelligence models which converges an output of each artificial intelligence model;
  comparing the model weight for each of the artificial intelligence models to a threshold value to determine a distance of the model weight from the threshold value; and
  estimating a residual life of the control valve based on the distance.

7. The method of claim 1, wherein compensating for the severity of the stiction includes at least one of compensating a response time, a load versus set-point change response, a variability in the at least one current segment, a control level, and an oscillation amplitude.

8. The method of claim 1, further comprising:
comparing, by the computing device, the at least one current segment to the digital twin model by:
  applying the at least one current segment to a Finite Impulse Response (FIR) filter model, determining a set of FIR filter parameters which converge a FIR filter output to match the at least one current segment, compensating for the severity of the stiction by generating the control signals based on the FIR filter parameters, and applying the control signals to the digital twin model;
  applying differential evolution to the at least one current segment of the pneumatically controlled valve system, identifying a best data-driven stiction data model, building a non-linear inverse model (NIM) of the best data-driven stiction data model and compensating for the severity of the stiction by generating the control signals based on the non-linear inverse model and applying the control signals to the digital twin model;
  applying differential evolution to the at least one current segment and/or the digital twin model of the pneumatically controlled valve system, identifying a best proportional-integral-derivative (PID) outer loop control gain which reduces the severity of the stiction, compensating for the stiction by applying the best PID outer loop control gain to the PID outer loop that controls the actuator of the digital twin model, and identifying a best proportional-integral-derivative (PID) inner loop control gain which reduces the severity of the stiction, compensating for the stiction by applying the best PID inner loop control gain to the PID inner loop that controls the actuator of the digital twin model;

determining which of the control signals based on the FIR filter parameters, the control signals based on the non-linear inverse model, the PID outer loop control gain and the PID inner loop control gain has a greatest effect on reducing the stiction of the digital twin model; and generating, by the computing device, instructions for the stiction control device to apply the control signals, the PID outer loop control gain or the PID inner loop control gain which have the greatest effect on reducing the stiction of the digital twin model to the actuator of the at least one control valve.

9. The stiction control system of claim 1, wherein the computing device is further configured to:
compare the at least one current segment to the digital twin model by:
applying the at least one current segment to a Finite Impulse Response (FIR) filter model;
determining a set of FIR filter parameters which converge a FIR filter output to match the at least one current segment; and
compensate for the severity of the stiction by generating the control signals based on the FIR filter parameters.

10. The stiction control system of claim 1, wherein the computing device is further configured to:
compare the at least one current segment to the digital twin model by:
applying differential evolution to the at least one current segment and/or the digital twin model of the at least one controllable pneumatic valve;
identifying a best proportional-integral-derivative (PID) inner loop control gain which reduces the severity of the stiction; and
compensate for the stiction by applying the best PID inner loop control gain to a PID inner loop that controls the actuator.

11. A stiction control system for compensating for stiction of an actuator of a controllable pneumatic valve, comprising:
a proportional-integral-derivative (PID) controller configured to receive set-point values (SP) at a PID controller input and output control signals at a PID controller output (OP);
a first switch connected to the PID controller output;
a stiction compensator switchably connected to the PID controller output by the first switch and configured to receive the control signals;
a controllable pneumatic valve input connected to the stiction compensator and switchably connected to the PID controller by the first switch;
a vibration measurement device connected to an output of the controllable pneumatic valve, the vibration measurement device configured to generate electrical signals based on an oscillation of an actuator of the controllable pneumatic valve;
a process measurement device connected at an input to the output of the controllable pneumatic valve and configured to output a process variable (PV) at a process output;
a feedback loop connected between the process output and the PID controller input;

a computing device connected to the stiction compensator, the computing device including circuitry and program instructions stored therein that, when executed by one or more processors, cause the one or more processors apply an artificial intelligence algorithm to the electrical signals of oscillation of the actuator of the controllable pneumatic valve, wherein the artificial intelligence algorithm generates sets of stiction reduction values; and
wherein the stiction compensator is configured to modify the control signals based on the sets of stiction reduction values,
wherein the computing device is further configured to:
build a digital twin model of the controllable pneumatic valve;
receive at least one current segment of electrical signals based on an oscillation of the controllable pneumatic valve;
monitor the operation of the controllable pneumatic valve by comparing the at least one current segment to the digital twin model;
detect stiction when an anomaly is detected between the at least one current segment and the digital twin model;
determine a severity of the stiction;
compensate for the severity of the stiction by generating the sets of stiction reduction values;
transmit the sets of stiction reduction values to the stiction compensator; and
display the digital twin model of the controllable pneumatic valve with a representation of the severity of the stiction; and
compare the at least one current segment to the digital twin model by:
applying differential evolution to the at least one current segment and/or the digital twin model of the at least one controllable pneumatic valve;
identifying a best proportional-integral-derivative (PID) outer loop control gain and/or a PID inner loop control gain which reduces the severity of the stiction; and
compensate for the stiction by applying the best PID outer loop control gain to a PID outer loop that controls the actuator;
wherein the computer device is further configured to:
determine which of the control signals based on a finite impulse response filter parameters, the control signals based on the non-linear inverse model, the PID outer loop control gain and the PID inner loop control gain has a greatest effect on reducing the stiction of the digital twin model; and
generate instructions for the stiction control device to apply the control signals, the PID outer loop control gain or the PID inner loop control gain which have the greatest effect on reducing the stiction of the digital twin model to the actuator of the at least one control valve.

12. The stiction control system of claim 11, wherein an input of the computing device is connected in parallel with the controllable pneumatic valve.

13. The stiction control system of claim 11, wherein a computing device input is connected to the PID controller input.

* * * * *